US009967253B2

(12) United States Patent
Tamura

(10) Patent No.: US 9,967,253 B2
(45) Date of Patent: May 8, 2018

(54) AUTHORITY DELEGATION SYSTEM, METHOD, AUTHENTICATION SERVER SYSTEM, AND STORAGE MEDIUM THEREFOR

(71) Applicant: CANON KABUSHIKI KAISHA, Tokyo (JP)

(72) Inventor: Yu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 14/723,301

(22) Filed: May 27, 2015

(65) Prior Publication Data

US 2015/0350209 A1 Dec. 3, 2015

(30) Foreign Application Priority Data

May 30, 2014 (JP) .................................. 2014-112626

(51) Int. Cl.
*H04L 29/06* (2006.01)
(52) U.S. Cl.
CPC ...... *H04L 63/0884* (2013.01); *H04L 63/0853* (2013.01); *H04L 63/10* (2013.01); *H04L 63/0807* (2013.01)
(58) Field of Classification Search
CPC ............ H04L 9/00; H04L 9/32–9/3297; H04L 63/04–63/0492; H04L 63/08–63/0892; H04L 63/0884; H04L 63/10; H04L 63/0853; H04L 63/0807; G06F 15/16–15/18; G06F 21/00; G06F 21/30–21/46; G06F 21/60–21/645; G06F 21/554; G06F 2221/033; G06F 9/00; H04N 7/16

USPC ................................ 713/150–154; 726/1–33
See application file for complete search history.

(56) References Cited

U.S. PATENT DOCUMENTS

| | | | |
|---|---|---|---|
| 2003/0101343 A1* | 5/2003 | Eaton ...................... | H04L 51/04 713/170 |
| 2011/0289573 A1* | 11/2011 | Seidl ................... | H04L 63/0815 726/7 |
| 2012/0117586 A1 | 5/2012 | McCoy | |
| 2012/0210414 A1* | 8/2012 | Tamura ............... | H04L 63/0815 726/8 |
| 2014/0137232 A1 | 5/2014 | Kobayashi | |

FOREIGN PATENT DOCUMENTS

| | | |
|---|---|---|
| CN | 102647407 A | 8/2012 |
| JP | 2013-145505 A | 7/2013 |

OTHER PUBLICATIONS

IETF RFC 6749: The OAuth 2.0 Authorization Framework.*

* cited by examiner

*Primary Examiner* — Ashok Patel
*Assistant Examiner* — Quazi Farooqui
(74) *Attorney, Agent, or Firm* — Canon U.S.A., Inc. IP Division

(57) ABSTRACT

There is provided an authority delegation system capable of issuing, in a case where an identifier of a user is associated with an identifier of a client, authority information indicating that an authority of the user has been delegated to the client without receiving an instruction for authorizing the authority of the user on the service to be delegated to the client.

11 Claims, 21 Drawing Sheets

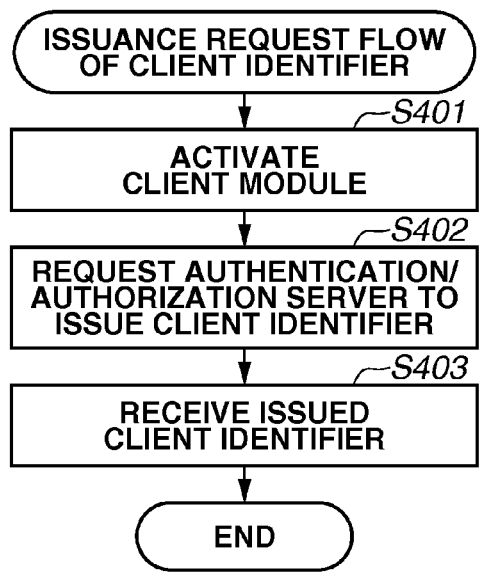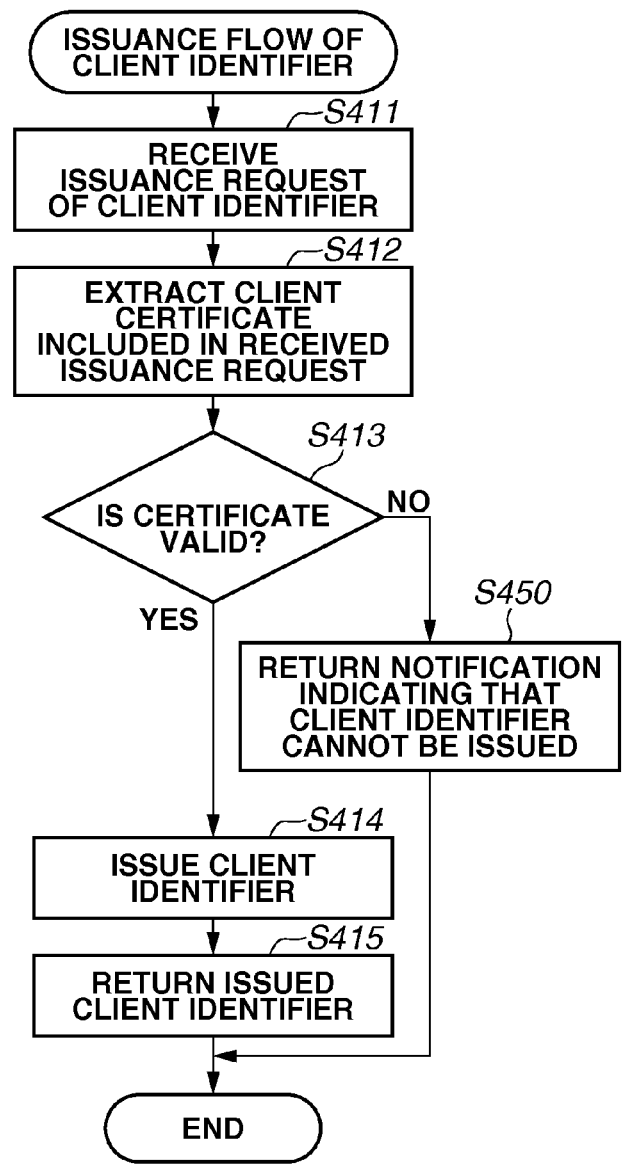

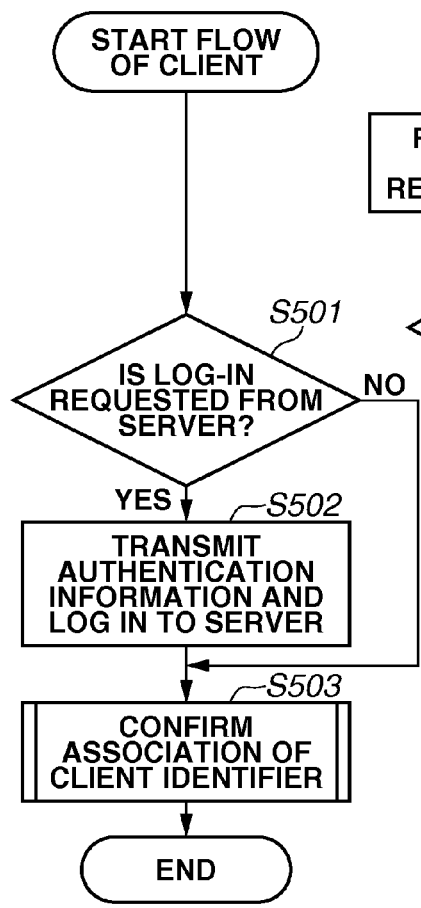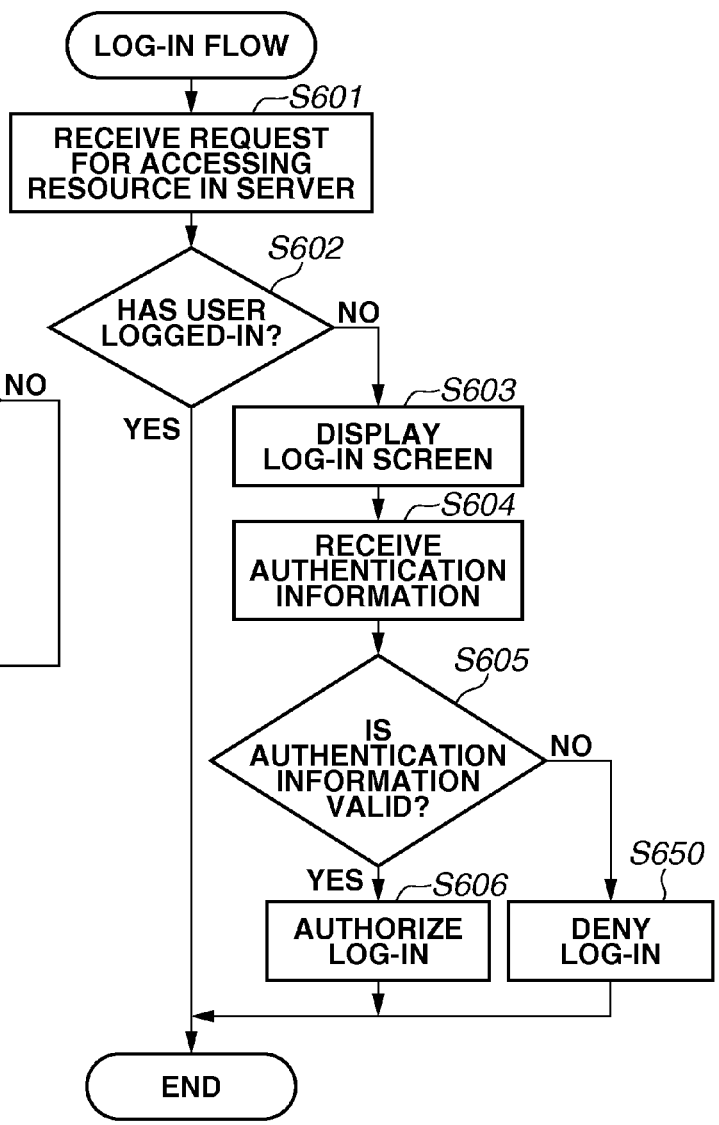

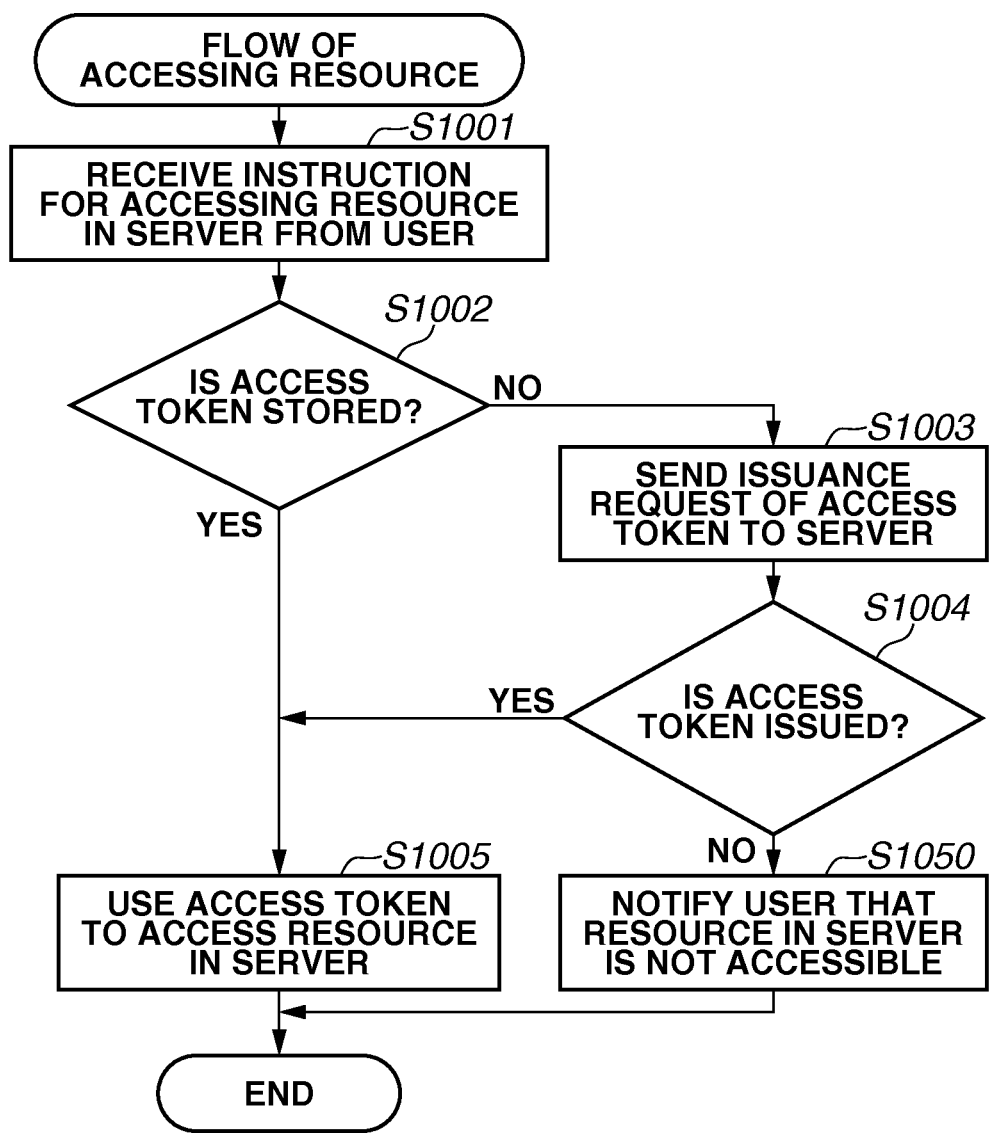

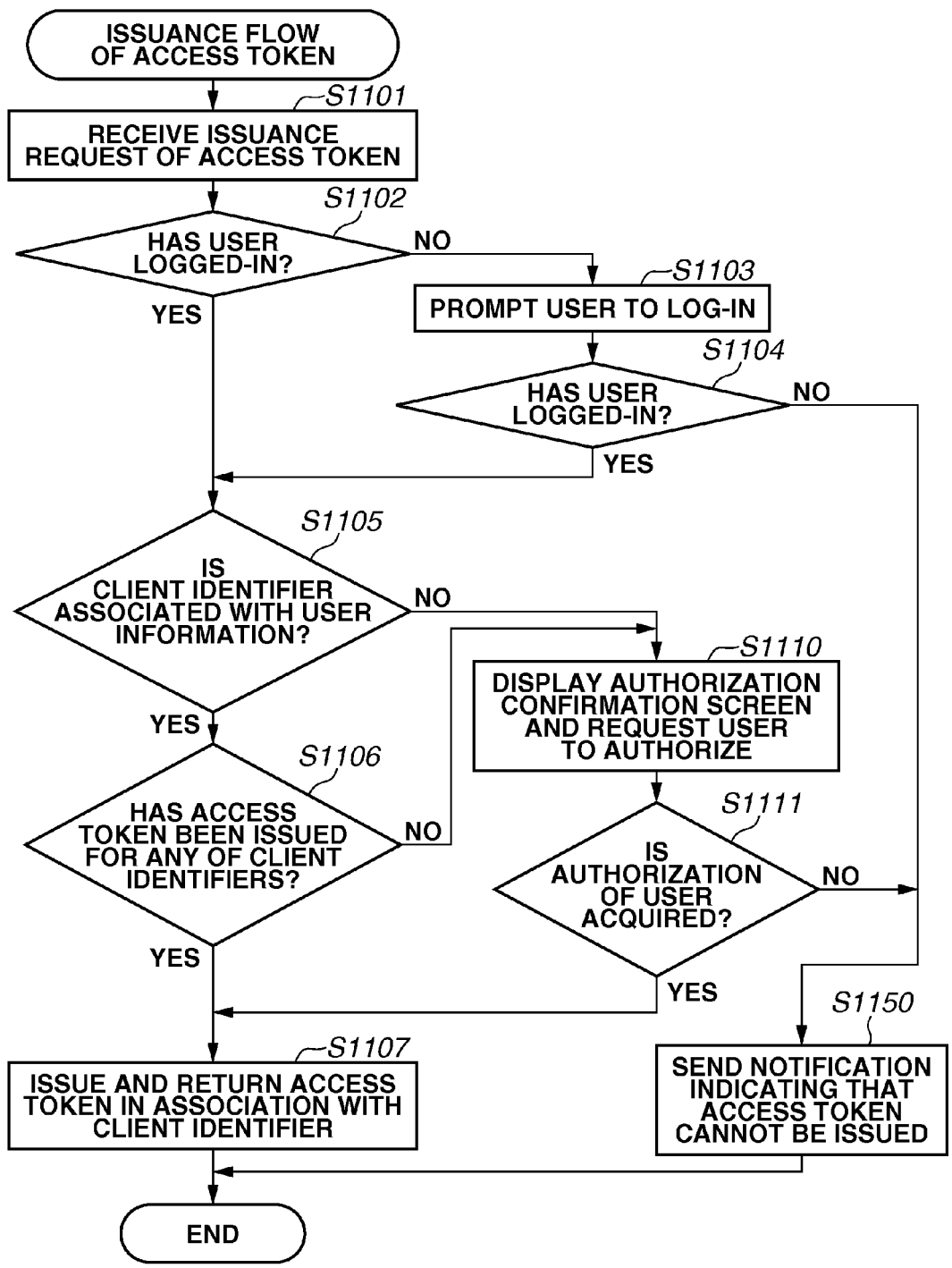

LOG IN TO SERVER

USER ID: User X

PASSWORD: ********

LOG-IN

ASSOCIATION OF CLIENT

WOULD YOU LIKE TO ASSOCIATE THIS CLIENT WITH YOUR USER ACCOUNT?

YOU CAN OMIT THE AUTHORIZATION OPERATION FOR OTHER CLIENTS IF AUTHORIZATION OPERATION IS EXECUTED ON ANY OF THE CLIENTS ASSOCIATED WITH YOUR USER ACCOUNT.

YES | NO

AUTHORIZATION CONFIRMATION

YOU ARE ASKED TO GIVE AUTHORIZATION TO ACCESS YOUR DATA.
PLEASE CHECK THE FOLLOWINGS AND AUTHORIZE OR DENY THE ACCESS.

[DATA TO BE ACCESSED]
DATA IN YOUR REPOSITORY
[ACCESS SOURCE]
App-A-mobile CLIENT

AUTHORIZE | DENY

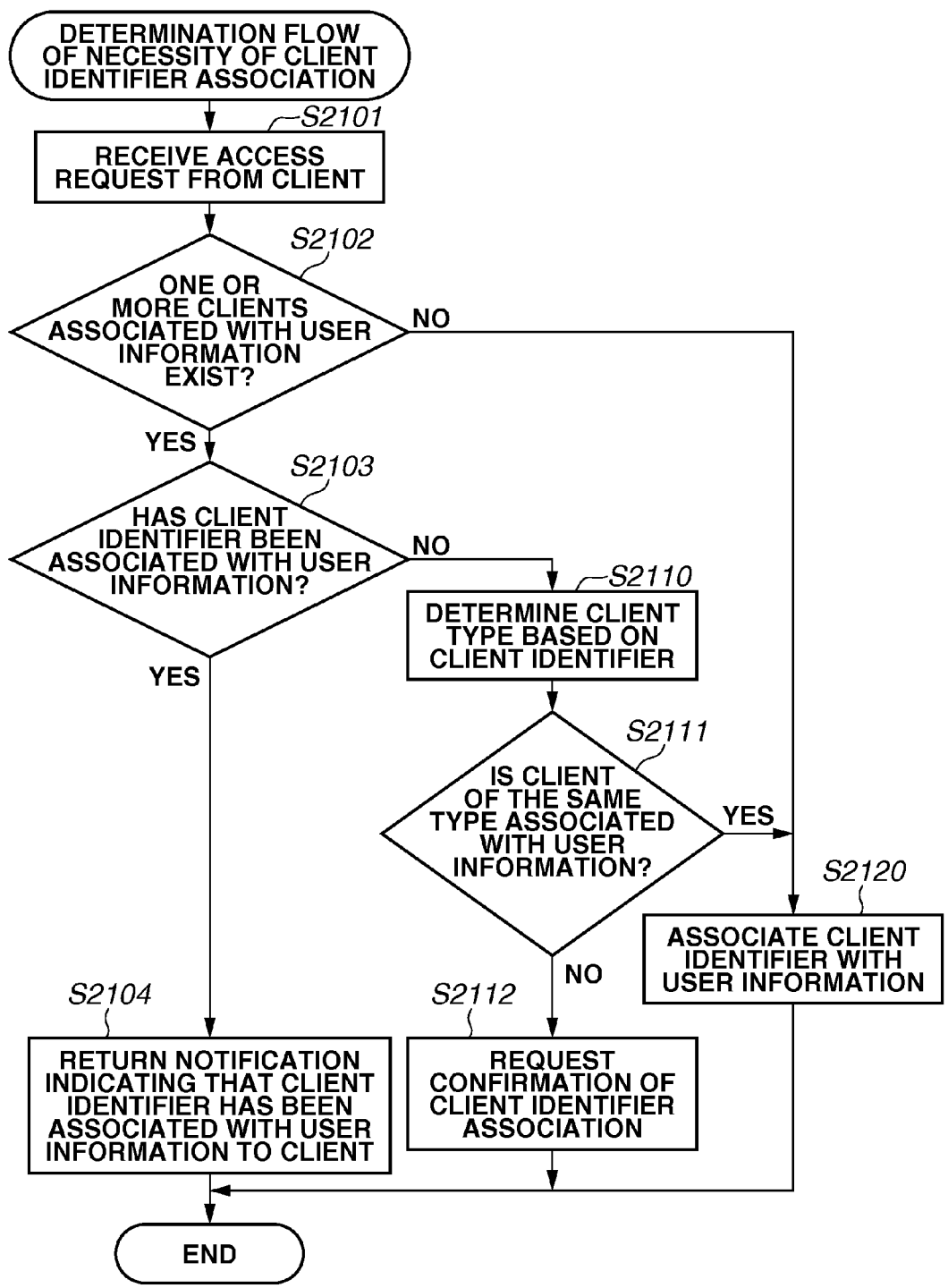

| LOG IN TO SERVER |

USER ID | User X

PASSWORD | ********

☒ ASSOCIATE THIS CLIENT WITH YOUR ACCOUNT.

LOG-IN

AUTHORITY DELEGATION SYSTEM, METHOD, AUTHENTICATION SERVER SYSTEM, AND STORAGE MEDIUM THEREFOR

BACKGROUND OF THE INVENTION

Field of the Invention

The present invention relates to an authority delegation system capable of delegating authority of a user to a client, a method, an authentication server system, and a storage medium therefor.

Description of the Related Art

As a cloud service has been generalized, there is an increased opportunity for a user to use a plurality of services in cooperation with one another. The service, or a web application, is a function provided by a server connected to a terminal via a network such as the internet. By making services cooperate with one another, a service provider can provide a new service to the user by adding value to a normal service. On the other hand, there arise some problems due to the cooperation of services.

In other words, there is a risk that information more than the user wants to exchange may be exchanged between the services, which may result in a problem such as leakage of user data or personal information. For example, although various services are available on the internet and could cooperate with one another, the user data or the personal information should not be operated by services except for those authorized by the user. Further, from a viewpoint of the service provider, it is preferable that a service cooperation system be implemented with ease.

In such a situation, a standard protocol known as "OAuth" has been developed in order to realize the cooperation in authorization. According to the OAuth, for example, if an application in one terminal accesses the data managed by the cloud service, the application needs to acquire an explicit authorization from a user.

With the authorization of the user, the application receives a token (hereinafter, referred to as "access token") certifying the access authorization, and thus the application can realize the access by using the access token afterward. Hereinafter, an operation for issuing the access token is referred to as "authorization operation". Japanese Patent Application Laid-Open No. 2013-145505 discusses a technique for issuing the access token by using the OAuth.

SUMMARY OF THE INVENTION

According to an aspect of the present invention, an authority delegation system having a server system providing a service accessible from a first client and a second client, and an authentication server system includes an authentication unit configured to determine whether a user is a legitimate user based on authentication information input by the user via an authentication screen displayed on the first client, an issuance unit configured to issue authority information indicating that authority of the user has been delegated to the first client in a case where the user determined to be the legitimate user by the authentication unit provides an instruction for authorizing the authority of the user on the service to be delegated to the first client via an authorization confirmation screen displayed on the first client, an authorization unit configured to authorize the first client to access the service by the authority of the user based on the authority information transmitted when the first client requests an access to the service, and a management unit configured to manage an identifier of the user determined to be the legitimate user by the authentication unit and an identifier of the second client in association with each other, wherein, in a case where the identifier of the user is associated with the identifier of the second client, the issuance unit issues authority information indicating that the authority of the user has been delegated to the second client without receiving an instruction for authorizing the authority of the user on the service to be delegated to the second client.

Further features of the present invention will become apparent from the following description of exemplary embodiments with reference to the attached drawings.

BRIEF DESCRIPTION OF THE DRAWINGS

FIGS. 4A and 4B are flowcharts each illustrating issuance processing of a client identifier according to the first exemplary embodiment.

FIGS. 5A and 5B are flowcharts illustrating start processing and log-in processing of a client, respectively, according to the first exemplary embodiment.

FIGS. 7A and 7B are flowcharts illustrating processing for accessing resources, and issuance processing of an access token, respectively, according to the first exemplary embodiment.

FIGS. 8A, 8B, and 8C are diagrams each illustrating display examples of screens according to the first exemplary embodiment.

FIGS. 10A and 10B are flowcharts according to the second exemplary embodiment.

FIG. 17 is a diagram illustrating a display example of a screen according to the fourth exemplary embodiment.

DESCRIPTION OF THE EMBODIMENTS

In recent years, as smartphones have become widespread, one user may possess a plurality of terminals in many cases.

Herein, a state where one user possesses a plurality of terminals is referred to as "one-user-multi-device state". In such a period of the one-user-multi-device state, a growing demand is expected for seamlessly using the terminals without being conscious about what terminal is being used from among a plurality of the user's terminals.

Assume that an application for accessing data managed by the cloud service is installed in each of a plurality of terminals. In order to access the data without using the authentication information of the user, for example, the application requires what is called "access token" in the OAuth, and needs to perform an authorization operation to issue the access token.

In a case where the conventional issuance processing is employed for issuing the access token, the authorization operation has to be individually executed on each of the terminals possessed by the user. Therefore, the user may become conscious about in what terminal the authorization operation has been or has not been executed, and thus it cannot be clearly said that the user can use the terminals in a seamless manner. This may result in lowering convenience of using the terminals under the one-user-multi-device state.

In consideration of the above-described situation, the present invention is directed to an authority delegation system capable of improving the convenience of using the terminals under the one-user-multi-device state.

Hereinafter, exemplary embodiments of the present invention will be described with reference to the drawings.

Figure 1:
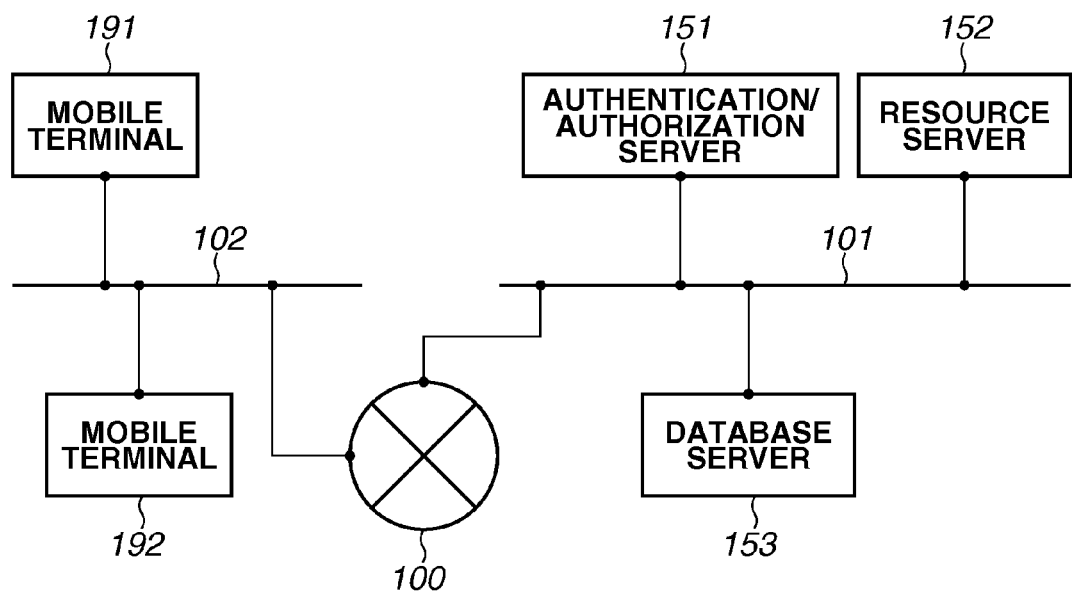
FIG. 1 is a block diagram illustrating a configuration of a network.

An authority delegation system according to a first exemplary embodiment is realized on a network having a configuration as illustrated in FIG. 1. In the present exemplary embodiment, a world wide web (WWW) is established as a wide area network (WAN) 100. A local area network (LAN) 101 connects constituent elements with one another. Mobile terminals are connected to a wireless network 102.

The authority delegation system includes an authentication/authorization server 151 for executing user authentication and issuance of an access token, a resource server 152, a database server 153, and mobile terminals 191 and 192 operated by a user. The access token is information certifying that a client (e.g., application) has been authorized to access a service by the user, and is issued when the user executes an authorization operation to authorize transition of user's authority to the application. For example, when the application uses the access token for accessing data managed by the cloud service, the application can access the data within a range authorized by the user. In the present exemplary embodiment, an access token expressed by a series of alphanumeric characters will be described as an example. However, the information thereof can be expressed in various ways, and thus such information is collectively referred to as "authority information".

The authentication/authorization server 151, the resource server 152, and the database server 153 are connected to one another via the WAN 100 and the LAN 101. Similarly, the mobile terminals 191 and 192 are connected to each other via the WAN 100 and the wireless network 102. In addition, the authentication/authorization server 151, the resource server 152, and the database server 153 may be respectively established on separate LANs, may be established on the same LAN, or may be established on the same personal computer (PC) or a server computer. Further, PCs (not illustrated) may be connected to the WAN 100 via the LAN 101 instead of the mobile terminals 191 and 192. Furthermore, in the present exemplary embodiment, although each of the above-described servers is described as a single server, the server may be a server group consisting of a plurality of servers. Therefore, the server may consist of one server or a plurality of servers when it is referred to as "server system". For example, an authentication server system may be an apparatus consisting of one or a plurality of the authentication/authorization server(s) 151.

Figure 2:
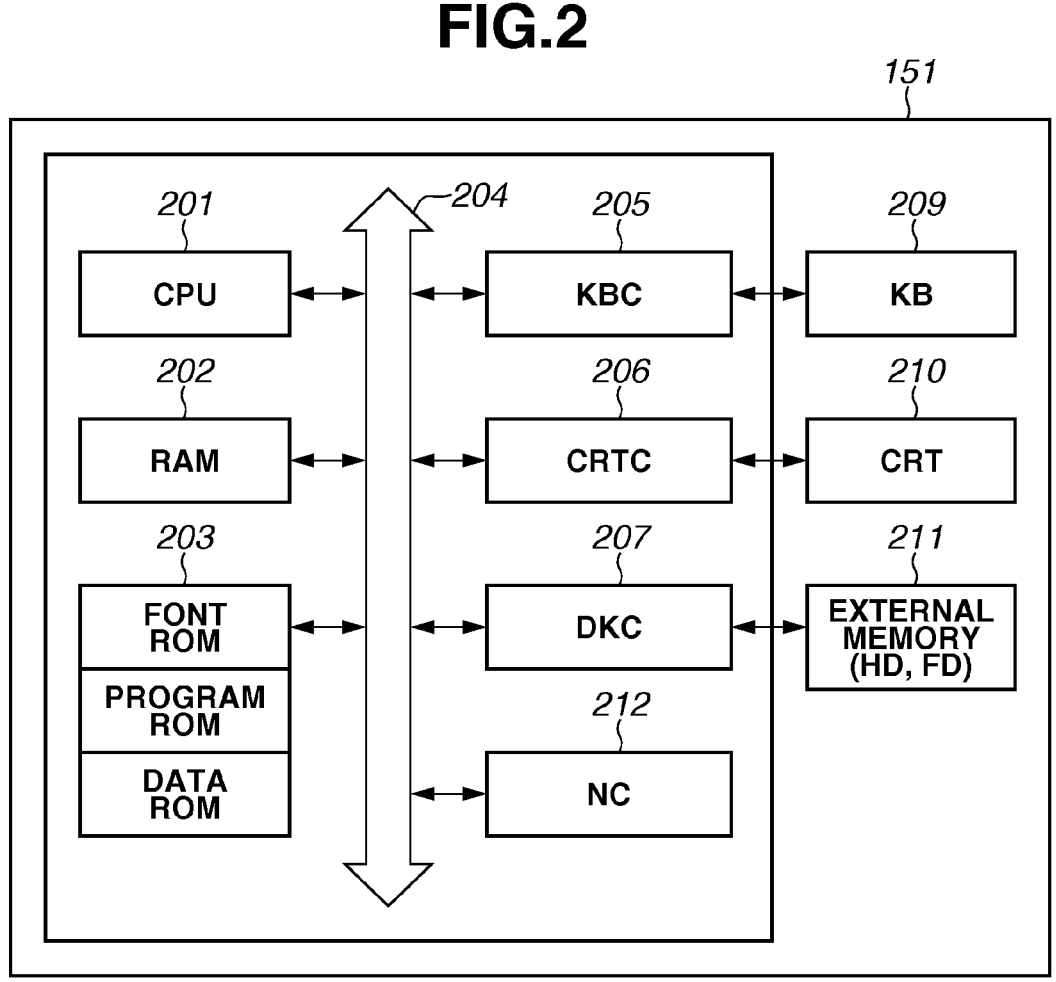
FIG. 2 is a block diagram illustrating a configuration of a server computer according to a first exemplary embodiment.

FIG. 2 is a block diagram illustrating a configuration of a server computer of the authentication/authorization server 151 according to the present exemplary embodiment. Further, the same configuration is also applicable to a configuration of a server computer for the resource server 152 or the database server 153, and a configuration of the mobile terminal 191 or 192. Furthermore, the hardware block diagram of FIG. 2 corresponds to that of a general information processing apparatus, and thus the hardware configuration of the general information processing apparatus is applicable to the server computers and the mobile terminals according to the present exemplary embodiment.

In FIG. 2, a central processing unit (CPU) 201 executes programs such as an operating system (OS) and applications stored in a program read only memory (ROM) of a ROM 203 or an external memory 211 such as a hard disk, and loaded on a random access memory (RAM) 202. The processing illustrated in below-described flowcharts can be realized by executing the program. The RAM 202 functions as a main memory or a work area of the CPU 201. A keyboard controller (KBC) 205 controls a key input received from a keyboard (KB) 209 or a pointing device (not illustrated). A cathode-ray tube controller (CRTC) 206 executes display control of a cathode-ray tube (CRT) display 210. A disk controller (DKC) 207 controls access to data within the external memory 211 such as a HD or a floppy disk (FD) (registered mark) for storing various kinds of data. A network computer (NC) 212 is connected to the network and executes control processing for communicating with other devices connected to the network.

In the description below, unless otherwise specified, the CPU 201 takes a major role in terms of hardware, whereas a function of the application program takes a major role in terms of software when the CPU 201 realizes the function thereof by executing the application program installed in the external memory 211.

Figure 3A:
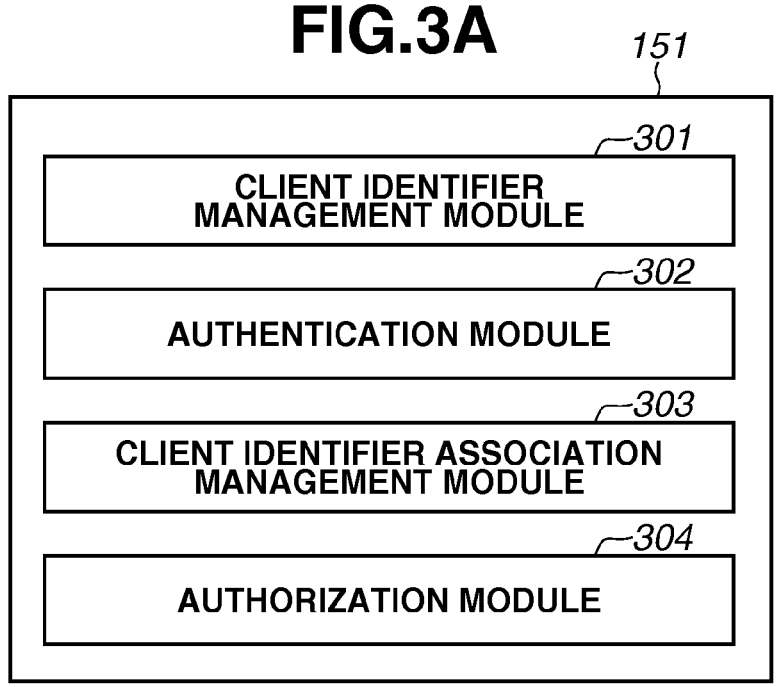
FIGS. 3A, 3B, and 3C are diagrams each illustrating a module configuration according to the first exemplary embodiment.
Figure 3B:
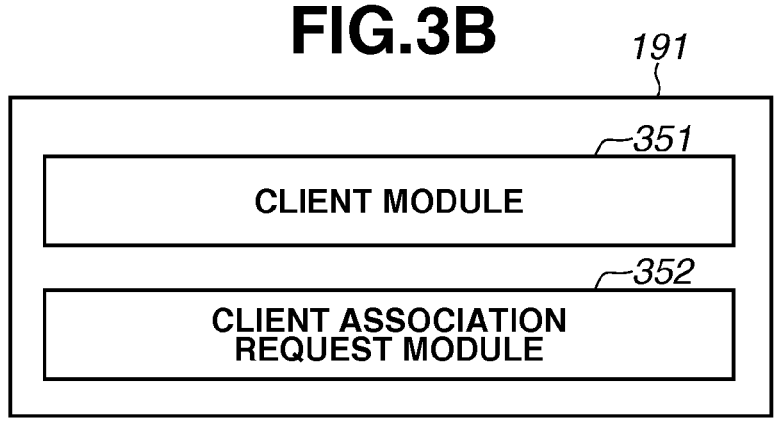
Figure 3C:
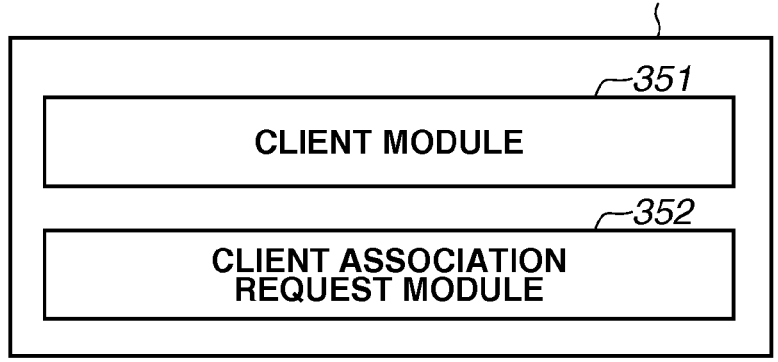

FIGS. 3A, 3B, and 3C are diagrams illustrating configurations of the authentication/authorization server 151, and the mobile terminals 191 and 192, respectively. The authentication/authorization server 151 includes a client identifier management module 301, an authentication module 302, a client identifier association management module 303, and an authorization module 304. Further, each of the mobile terminals 191 and 192 includes a client module 351 and a client association request module 352. In addition, the resource server 152 (not illustrated in FIG. 2) includes a service accessible by the mobile terminal 191 and/or the mobile terminal 192 authorized to access the service by the authority of the user delegated thereto. The service executes a function of the service requested from the mobile terminal 191 and/or the mobile terminal 192.

A flow of authority delegation according to the present exemplary embodiment is started from a prior setting of a client identifier as illustrated in FIGS. 4A and 4B. Then, processing illustrated in FIG. 7A is started when the user uses the mobile terminal 191 or 192, or an optional mobile terminal to access the resource server 152. Then, whether the authentication information input by the user via an authentication screen is legitimate information is verified as illustrated in FIGS. 5A and 5B. Thereafter, a user identifier and a client identifier are associated with each other through the processing illustrated in FIGS. 6A to 6C, and processing according to the present exemplary embodiment is executed as illustrated in FIG. 7B. Through the above processing, it is possible to reduce a load of the user for executing the authorization operation on the second and the subsequent mobile terminals. Hereinafter, respective flows of processing will be described in detail.

FIG. 4A is a flowchart illustrating an issuance request flow of the client identifier implemented by the mobile terminal 191 or 192 according to the present exemplary embodiment. This processing flow is started when the user activates the client module 351.

In step S401, the client module 351 is activated by receiving an activation instruction from the user. In step S402, the client module 351 sends an issuance request of the client identifier to the authentication/authorization server 151. The issuance request of the client identifier includes a client certificate previously allocated to the client module 351. In step S403, the client module 351 receives a client identifier issued by the authentication/authorization server 151 and ends the processing.

FIG. 4B is a flowchart illustrating an issuance flow of the client identifier implemented by the authentication/authorization server 151 according to the present exemplary embodiment. This processing flow is started when the authentication/authorization server 151 receives the issuance request of the client identifier from the client module 351.

In step S411, the client identifier management module 301 receives the issuance request of the client identifier from the client module 351. In step S412, the client identifier management module 301 extracts a client certificate included in the received issuance request of the client identifier. In step S413, the client identifier management module 301 determines whether the client certificate extracted in step S412 is valid. In a case where the client certificate is determined to be valid (YES in step S413), the processing proceeds to step S414. In a case where the client certificate is determined to be invalid (NO in step S413), the processing proceeds to step S450.

In step S414, the client identifier management module 301 issues a client identifier in response to the issuance request of the client identifier received from the client module 351. The issued client identifier is stored in the client identifier management module 301. Table 1 is a client identifier table illustrating the issued client identifiers stored in the client identifier management module 301. Herein, a client identifier AppAm001 and a client identifier AppAm002 are respectively issued to the client modules 351 of the mobile terminals 191 and 192. Different client identifier is issued to the client modules 351 of each of the mobile terminals 191 and 192.

TABLE 1

| Client Identifier |
| --- |
| AppAm001 |
| AppAm002 |
| : |

In step S415, the client identifier management module 301 returns the client identifier issued in step S414 to the client module 351 and ends the processing. In step S450, the client identifier management module 301 returns a notification indicating that the client identifier cannot be issued to the client module 351, and ends the processing.

FIG. 5A is a flowchart illustrating a start flow of the client implemented by the mobile terminal 191 or 192 according to the present exemplary embodiment. This processing flow is started when the user operates the client module 351.

In step S501, the client module 351 determines whether log-in is requested from the authentication/authorization server 151 in response to the instruction in step S1103. If it is determined that the log-in is requested (YES in step S501), the processing proceeds to step S502. If it is determined that the log-in is not requested (NO in step S501), the processing proceeds to step S503.

In step S502, in response the request from the authentication/authorization server 151, the client module 351 displays a log-in screen 1401 illustrated in FIG. 8A and prompts the user to input authentication information. Further, the client module 351 transmits the authentication information input by the user and logs in to the authentication/authorization server 151. In step S503, the client association request module 352 confirms association of the client identifier. The confirmation of the client identifier association will be described below in detail.

FIG. 5B is a flowchart illustrating a log-in flow implemented by the authentication/authorization server 151 according to the present exemplary embodiment. This processing flow is started when the authentication/authorization server 151 receives a request for accessing resources from the client module 351. In step S601, the authentication module 302 receives a request for accessing the resources in the resource server 152 from the client module 351. In step S602, the authentication module 302 determines whether the user relating to the processing in step S601 has logged-in. If it is determined that the user has logged-in (YES in step S602), the authentication module 302 ends the processing. If it is determined that the user has not logged-in (NO in step S602), the processing proceeds to step S603.

In step S603, the authentication module 302 instructs the client module 351 to display the log-in screen 1401 illustrated in FIG. 8A. In step S604, the authentication module 302 receives the authentication information input to the log-in screen 1401. In step S605, the authentication module 302 determines whether the authentication information received in step S604 is valid. In a case where the authentication information is determined to be valid and thus the user is determined to be a legitimate user (YES in step S605), the processing proceeds to step S606. In a case where the authentication information is determined to be invalid (NO in step S605), the processing proceeds to step S650. In step S606, the authentication module 302 authorizes the log-in of the user and ends the processing. In step S650, the authentication module 302 denies the log-in of the user and ends the processing.

Figure 6A:
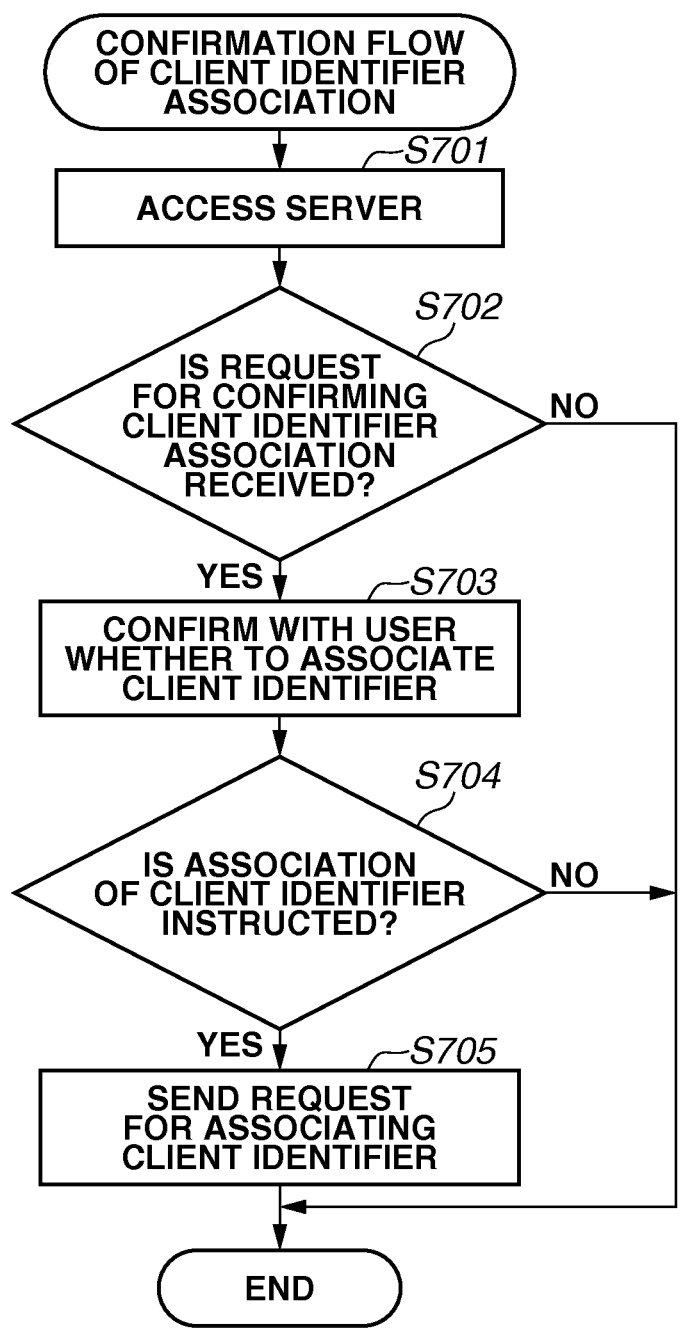
FIGS. 6A, 6B, and 6C are flowcharts illustrating confirmation processing of client identifier association, determination processing of necessity of the client identifier association, and association processing of the client identifier, respectively, according to the first exemplary embodiment.

FIG. 6A is a flowchart illustrating a confirmation flow of the client identifier association implemented by the mobile terminal 191 or 192 according to the present exemplary embodiment. This processing flow describes the processing of step S503 in FIG. 5A in detail.

In step S701, the client association request module 352 accesses the authentication/authorization server 151. The access request received by the authentication/authorization server 151 includes information of the user who operates the mobile terminal and the client identifier received in step S403. In step S702, the client association request module 352 determines whether the confirmation of the client identifier association is requested in response to the processing executed in step S701. If it is determined that the confirmation is requested (YES in step S702), the processing proceeds to step S703. If it is determined that the confirmation is not requested (NO in step S702), the client association request module 352 ends the processing without requesting the client identifier association.

In step S703, according to an instruction from the authentication/authorization server 151, the client association request module 352 displays a client association confirmation screen 1402 illustrated in FIG. 8B and confirms with the user whether to associate the client identifier. The processing for confirming with the user whether to associate the client identifier is referred to as confirmation processing of the client identifier association. In step S704, in response to the confirmation made in step S703, the client association request module 352 determines whether an instruction for associating the user information with the client identifier is instructed. If it is determined that the association is instructed (YES in step S704), the processing proceeds to step S705. If it is determined that the association is not instructed (NO in step S704), the client association request module 352 ends the processing without requesting the client identifier association.

In step S705, the client association request module 352 sends the association request of the client identifier to the authentication/authorization server 151. At this time, the association request of the client identifier includes the information of the user who operates the mobile terminal and the client identifier received in step S403. After sending the association request of the client identifier, the client association request module 352 ends the processing.

Figure 6B:
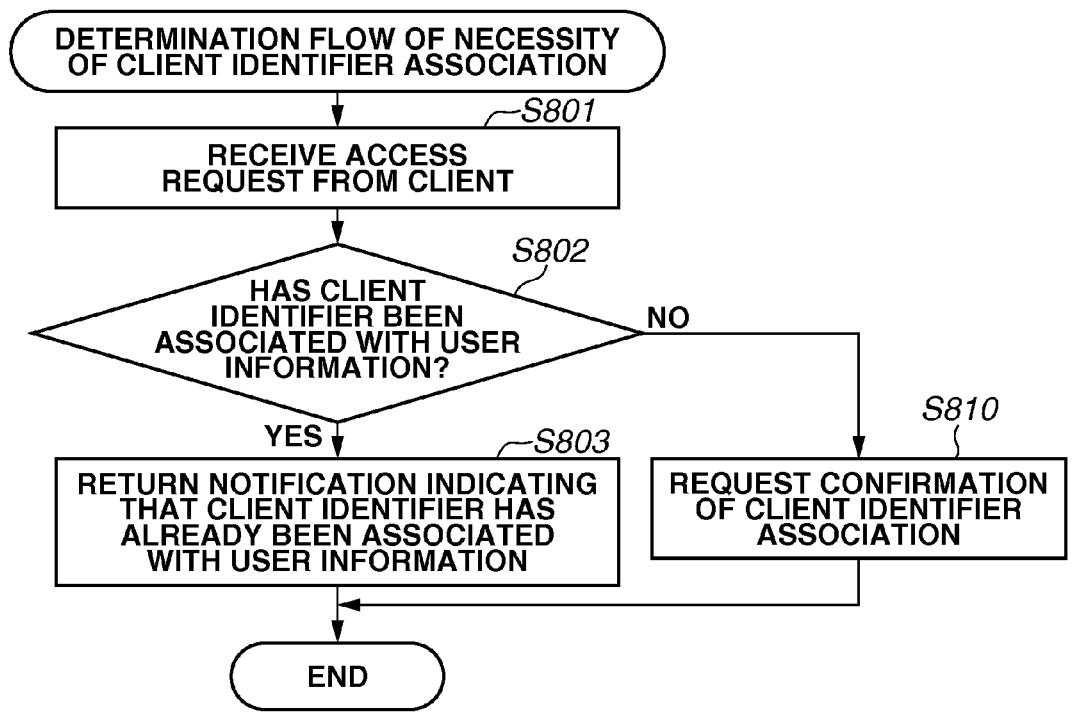

FIG. 6B is a flowchart illustrating a determination flow of necessity of the client identifier association implemented by the authentication/authorization server 151 according to the present exemplary embodiment. This processing flow is started when the authentication/authorization server 151 receives the access request from the client module 351. Determination processing in step S702 is executed based on a result acquired from the processing in FIG. 6B. In step S801, the client identifier association management module 303 receives the access request from the client module 351. The access request received in step S801 includes the user information and the client identifier.

In step S802, based on the user information and the client identifier included in the access request received in step S801, the client identifier association management module 303 determines whether the client identifier has been associated with the user information. If it is determined that the client identifier has been associated with the user information (YES in step S802), the processing proceeds to step S803. If it is determined that the client identifier has not been associated with the user information (NO in step S802), the processing proceeds to step S810. Table 2 is a client identifier association table illustrating an association state between the user information and the client identifiers stored in the client identifier association management module 303. Herein, client identifiers "AppAm001" and "AppAm002" are associated with the user information "User X". If the user information and the client identifier received in step S801 are "User X" and "AppAm001" respectively, in step S802, it is determined that the client identifier has been associated with the user information.

TABLE 2

| User | Client Identifier |
| --- | --- |
| User X | AppAm001 |
| User X | AppAm002 |
| : | : |

In step S803, the client identifier association management module 303 returns a notification indicating that the client identifier has been associated with the user information and thus confirmation of the client identifier association is not necessary to the client module 351, and ends the processing. In step S810, the client identifier association management module 303 requests the client module 351 to confirm the client identifier association and causes the client module 351 to display the client association confirmation screen 1402 as illustrated in FIG. 8B. After requesting the confirmation of the client identifier association, the client identifier association management module 303 ends the processing.

Figure 6C:
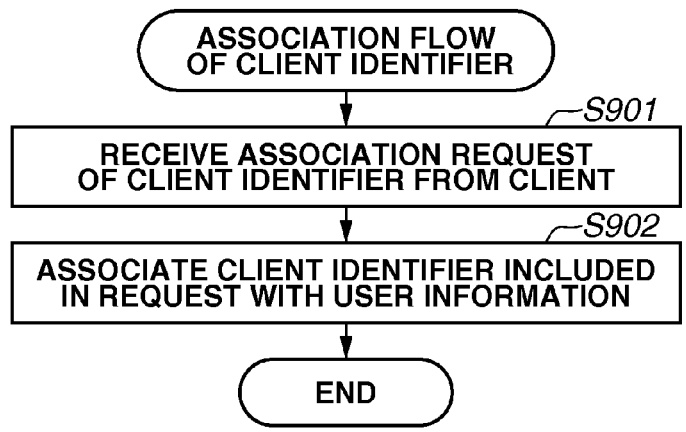

FIG. 6C is a flowchart illustrating an association flow of the client identifier implemented by the authentication/authorization server 151 according to the present exemplary embodiment. This processing flow is started when the authentication/authorization server 151 receives an association request of the client identifier from the client module 351. This processing flow is implemented in response to the association request of step S705.

In step S901, the client identifier association management module 303 receives the association request of the client identifier from the client module 351. The association request of the client identifier received in step S901 includes the user information and the client identifier. In step S902, the client identifier association management module 303 stores the client identifier included in the request received in step S901 in the client identifier association table in association with the user information. After storing the associated client identifier, the client identifier association management module 303 ends the processing. Through the above-described processing, the user firstly accesses the resource server 152 by using either of the mobile terminals 191 and 192.

FIG. 7A is a flowchart illustrating a flow of accessing resources in the resource server 152 implemented by the mobile terminal 191 or 192 according to the present exemplary embodiment. This processing flow is started when the client module 351 receives an instruction for accessing the resource in the resource server 152 from the user.

In step S1001, the client module 351 receives an instruction for accessing the resources in the resource server 152 from the user. In step S1002, the client module 351 determines whether an access token necessary to access the resource server 152 is stored. If it is determined that the access token is stored (YES in step S1002), the processing proceeds to step S1005. If it is determined that the access token is not stored (NO in step S1002), the processing proceeds to step S1003.

In step S1003, the client module 351 sends an issuance request of the access token to the authentication/authorization server 151. The issuance request of the access token includes the information of user who operates the mobile terminal and the client identifier received in step S403. In step S1004, the client module 351 determines whether the access token is issued in response to the issuance request in step S1003. If it is determined that the access token is issued (YES in step S1004), the processing proceeds to step S1005. If it is determined that the access token is not issued (NO in step S1004), the processing proceeds to step S1050.

In step S1005, the client module 351 stores the access token acquired in response to the issuance request in step S1003, accesses the resources in the resource server 152 by using the access token, and ends the processing. In step S1050, the client module 351 notifies the user that the resource server 152 is not accessible because the access token cannot be acquired, and ends the processing.

FIG. 7B is a flowchart illustrating an issuance flow of the access token implemented by the authentication/authorization server 151 according to the present exemplary embodiment. This processing flow is started when the authorization module 304 of the authentication/authorization server 151 receives the issuance request of the access token from the client module 351 in step S1003.

In step S1101, the authorization module 304 receives the issuance request of the access token from the client module 351. The issuance request of the access token received in step S1101 includes the user information and the client identifier. In step S1102, the authorization module 304 determines whether the user who operates the client module 351 has logged-in. If it is determined that the user has logged-in (YES in step S1102), the processing proceeds to step S1105. If it is determined that the user has not logged-in (NO in step S1102), the processing proceeds to step S1103.

In step S1103, the authentication module 302 instructs the client module 351 to display the log-in screen 1401 as illustrated in FIG. 8A in order to prompt the user to log-in. In addition, details of the log-in flow are the same as those described in FIG. 5B. In step S1104, the authentication module 302 determines whether the user has logged-in in response to the processing in step S1103. If it is determined that the user has logged-in (YES in step S1104), the processing proceeds to step S1105. If it is determined that the user has not logged-in (NO in step S1104), the processing proceeds to step S1150.

In step S1105, the client identifier management module 303 determines whether the client identifier included in the issuance request of the access token received in step S1101 is associated with the user information based on the client identifier association table illustrated in Table 2. If it is determined that the client identifier is associated with the user information (YES in step S1105), the processing proceeds to step S1106. If it is determined that the client identifier is not associated with the user information (NO in step S1105), the processing proceeds to step S1110. For example, in a case where the user information is "User X" whereas the client identifier is "AppAm002", the processing proceeds to step S1106 because the user information and the client identifier are associated with each other.

In step S1106, the authorization module 304 determines whether the access token has been issued for any of the client identifiers associated with the user information. If it is determined that the access token has been issued for any of the client identifiers associated with the user information (YES in step S1106), the processing proceeds to step S1107. In step S1107, the authorization module 304 issues the access token without asking the user to confirm the authorization. In other words, the access token is issued even if the user does not provide an instruction for authorizing the authority of the user on the service provided by the resource server 152 to be delegated to the client indicated by the client identifier.

If it is determined that the access token has not been issued (NO in step S1106), the processing proceeds to step S1110. Table 3 is an access token table illustrating a state where the access token 11111111 has been issued because the user indicated by the user information "User X" has authorized the client module 351 of the client indicated by the client identifier "AppAm001". In the above case, for example, if the user information is "User X" and the client identifier is "AppAm002", the access token has not been issued for the client identifier "AppAm002". However, the access token has already been issued for the client identifier "AppAm001" associated with "User X". Therefore, it is determined that the access token has already been issued for any of the client identifiers associated with the user information, so that the processing proceeds to step S1107.

TABLE 3

| Client Identifier | User | Access Token |
|---|---|---|
| AppAm001 | User X | 11111111 |
| ⋮ | ⋮ | ⋮ |

In step S1107, the authorization module 304 issues the access token, and stores the access token in the access token table of Table 3 in association with the client identifier and the user information included in the issuance request of the access token received in step S1101. Further, the authorization module 304 returns the issued access token to the client module 351 and ends the processing.

In step S1110, the authorization module 304 instructs the client module 351 to display an authorization confirmation screen 1403 as illustrated in FIG. 8C and asks the user to confirm authorization. In step S1111, the authorization module 304 determines whether authorization of the user is acquired in response to the processing in step S1110. If it is determined that the authorization is acquired (YES in step S1111), the processing proceeds to step S1107. If it is determined that the authorization is not acquired (NO in step S1111), the processing proceeds to step S1150. An operation in which the user selects "authorize" in the screen illustrated in FIG. 8C to provide an instruction for authorizing the authority of the user on the service to be delegated to the client is referred to as "authorization operation", and the access token is issued when the user executes the authorization operation. In step S1150, the authorization module 304 notifies the client module 351 that the access token cannot be issued, and ends the processing.

FIGS. 8A, 8B, and 8C are diagrams each illustrating a display example of a screen according to the present exemplary embodiment. FIG. 8A is a diagram illustrating an example of the log-in screen 1401 operated by the user to log-in to the server. FIG. 8B is a diagram illustrating an example of the client association confirmation screen 1402 through which the user confirms to associate the client module 351 with the user. Further, FIG. 8C is a diagram illustrating an example of the authorization confirmation screen 1403 through which the user authorizes the client module 351 to issue the access token.

According to the present exemplary embodiment, if the access token has been issued for any of the clients indicated by the client identifiers associated with the user information, the access token can be issued to the client to which the access token has not been issued by omitting the authorization operation. As a result, if the user associates a first terminal owned by the user and causes an access token to be issued for that first terminal, access tokens for the second and the subsequent associated terminals are issued without the authorization operation, and thus the convenience for the user can be improved.

In particular, the above configuration is useful when the access token has been expired so that the user has to execute the authorization operation again. When the access token has been expired, the user has to issue a new access token with respect to the client identifier by operating the authorization confirmation screen 1403. If the configuration according to the present exemplary embodiment is not applied, the user has to execute the authorization operation at each of the terminals owned by the user. On the other hand, according to the present exemplary embodiment, although the user has to operate the client association confirmation screen 1402 in order to issue the access token first time, the user can omit the operation of the authorization confirmation screen 1403 without operating the client association confirmation screen 1402 when the access tokens for the second and the subsequent associated terminals are reissued. As a result, the user can omit the operation of the authorization confirmation screen 1403 for the second and the subsequent associated terminals, and thus the convenience for the user is improved.

Next, a second exemplary embodiment of the present invention will be described with reference to the drawings. Hereinafter, only the configuration different from that according to the first exemplary embodiment will be described while description of the configuration common to both of the exemplary embodiments will be omitted. In the first exemplary embodiment, it is necessary to perform the operation for associating the client identifier with the user information. A method for omitting the above operation according to the present exemplary embodiment will be described.

Figure 9:
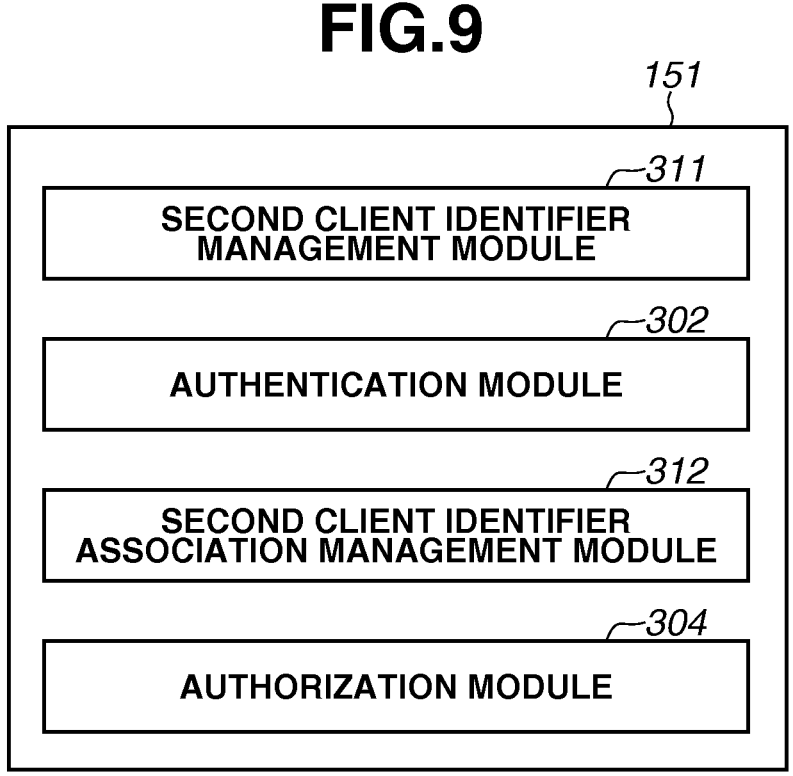
FIG. 9 is a diagram illustrating a module configuration according to a second exemplary embodiment.

FIG. 9 is a diagram illustrating a module configuration of the authentication/authorization server 151 according to the present exemplary embodiment. The authentication/authorization server 151 includes the authentication module 302 and the authorization module 304. The authentication/authorization server 151 further includes a second client identifier management module 311 and a second client identifier association management module 312.

Figure 10A:
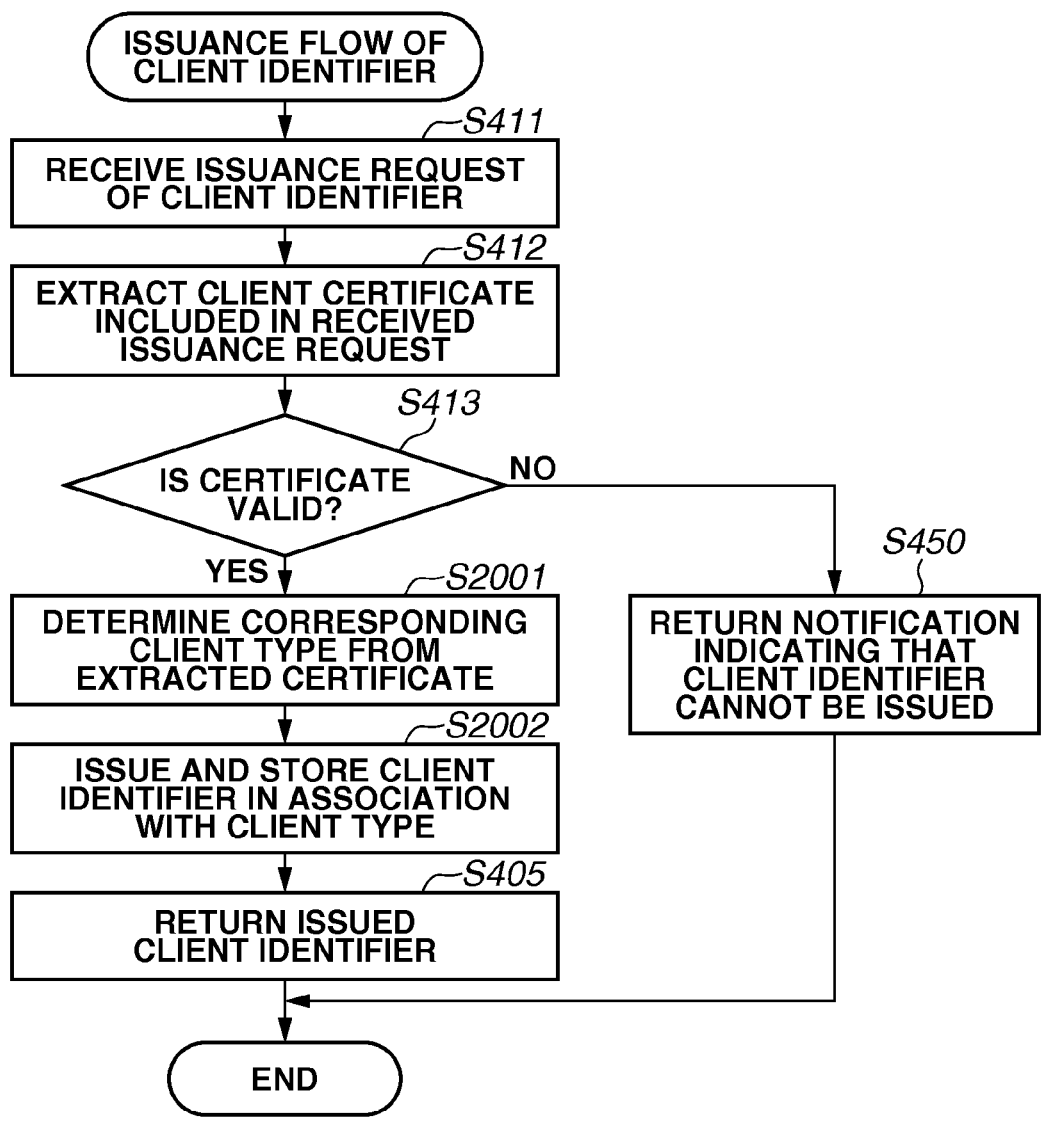

FIG. 10A is a flowchart illustrating an issuance flow of the client identifier implemented by the authentication/authorization server 151 according to the present exemplary embodiment. This processing flow is started when the authentication/authorization server 151 receives the issuance request of the client identifier from the client module 351.

In step S2001, the second client identifier management module 311 determines a type of the client module 351 based on the certificate extracted in step S412. Table 4 is a client type table in which certification information and client types are managed in association with each other. For example, if the certificate extracted in step S412 is "CertC", the client type is determined to be "App-A-mobile".

TABLE 4

| Certificate | Client Type |
| --- | --- |
| CertC | App-A-mobile |
| : | : |

In step S2002, the second client identifier management module 311 issues a client identifier and stores the client identifier in association with the client type determined in step S2001. Table 5 is a second client identifier table illustrating a state where the client type of both the client identifiers "AppAm001" and "AppAm002" is "App-A-mobile".

TABLE 5

| Client Identifier | Client Type |
| --- | --- |
| AppAm001 | App-A-mobile |
| AppAm002 | App-A-mobile |
| : | : |

FIG. 10B is a flowchart illustrating a determination flow of necessity of the client identifier association implemented by the authentication/authorization server 151 according to the present exemplary embodiment. This processing flow is started when the authentication/authorization server 151 receives the access request from the client module 351. In step S2101, the second client identifier association management module 312 receives the access request from the client module 351. The access request includes the user information and the client identifier.

In step S2101, the second client identifier association management module 312 determines whether one or more client identifiers associated with the user information received in step S2101 exist. If it is determined that one or more client identifiers associated with the user information exist (YES in step S2102), the processing proceeds to step S2103. If it is determined that the client identifier associated with the user information does not exist (NO in step S2102), the processing proceeds to step S2120. In step S2120, the second client identifier association management module 312 associates the client identifier with the user information without confirming the association. Table 6 is a second client identifier association table illustrating the association of the user information and the client identifiers, and corresponding client type stored in the second client identifier association management module 312. In Table 6, the client identifiers "AppAm001" and "AppAm002" are associated with the user information "User X". Further, the client type of both the client identifiers "AppAm001" and "AppAm002" is "App-A-mobile". Herein, if the user information received in step S2101 is "User X", in step S2102, it is determined that one or more client identifiers associated with the user information exist.

TABLE 6

| User | Client Identifier | Client Type |
| --- | --- | --- |
| User X | AppAm001 | App-A-mobile |
| User X | AppAm002 | App-A-mobile |
| : | : | : |

In step S2103, based on the user information and the client identifier included in the access request received in step S2101, the second client identifier association management module 312 determines whether the client identifier has been associated with the user information. If it is determined that the client identifier has been associated with the user information (YES in step S2103), the processing proceeds to step S2104. If it is determined that the client identifier has not been associated with the user information (NO in step S2103), the processing proceeds to step S2110.

In step S2104, the second client identifier association management module 312 returns a notification indicating that the client identifier has been associated with the user information and thus the confirmation of the client identifier association is not necessary to the client module 351 and ends the processing. In step S2110, the second client identifier association management module 312 refers to the client identifier table illustrated in Table 5 and determines the client type of the client identifier received in step S2101. For example, if the client identifier is "AppAm001", the client type is "App-A-mobile".

In step S2111, the second client identifier association management module 312 determines whether the client of the same type with the client type determined in step S2110 is associated with the user information. If it is determined that the client of the same type is associated with the user information (YES in step S2111), the processing proceeds to step S2120. In step S2120, the second client identifier association management module 312 associates the client identifier with the user information without confirming the association. In other words, the user does not have to provide an instruction for associating the second client identifier via the client association confirmation screen 1402 where the user is asked to instruct whether to associate the second client identifier with the user information. Further, if it is determined that the client of the same type is not associated with the user information (NO in step S2111), the processing proceeds to step S2112.

In step S2112, the second client identifier association management module 312 requests the client module 351 to confirm the client identifier association, and causes the client module 351 to display the client association confirmation screen 1402 as illustrated in FIG. 8B. After requesting the confirmation of the client identifier association, the second client identifier association management module 312 ends the processing.

In step S2120, in order to omit the confirmation of the client identifier association, the second client identifier association management module 312 associates the client identifier with the user information without providing the client association confirmation screen 1402 illustrated in FIG. 8B to the mobile terminal 191.

According to the exemplary embodiment of the present invention, the user can omit the association confirmation operation when the client identifier of the same type is associated with the user information. Therefore, the convenience for the user can be further improved. Further, the user can also omit the association confirmation operation when the user associates the client identifier with the user information first time, and thus the convenience for the user is also improved.

Next, a third exemplary embodiment of the present invention will be described with reference to the drawings. Only the configuration different from those according to the first and the second exemplary embodiments will be described while description of the configuration common to all of the exemplary embodiments will be omitted. Described below is a method for omitting the operation for associating the client identifier by previously executing specific settings on the authentication/authorization server 151, according to the present exemplary embodiment.

Figure 11:
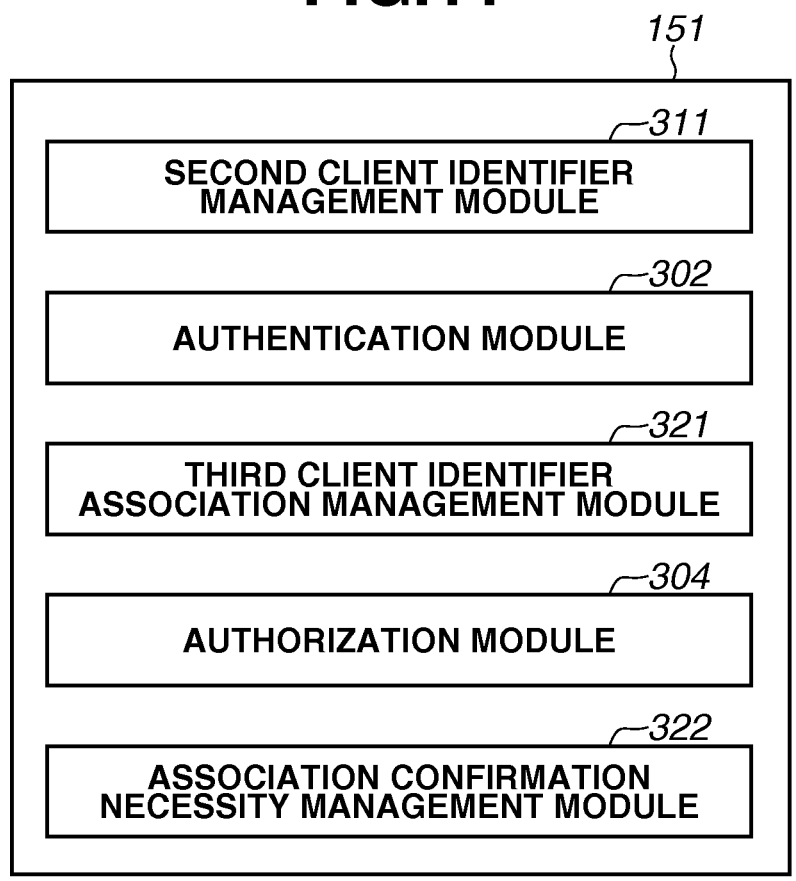
FIG. 11 is a diagram illustrating a module configuration according to a third exemplary embodiment.

FIG. 11 is a diagram illustrating a module configuration of the authentication/authorization server 151 according to the present exemplary embodiment. The authentication/authorization server 151 includes the authentication module 302, the authorization module 304, and the second client identifier management module 311. The authentication/authorization server 151 further includes a third client identifier association management module 321 and an association confirmation necessity management module 322.

Figure 12:
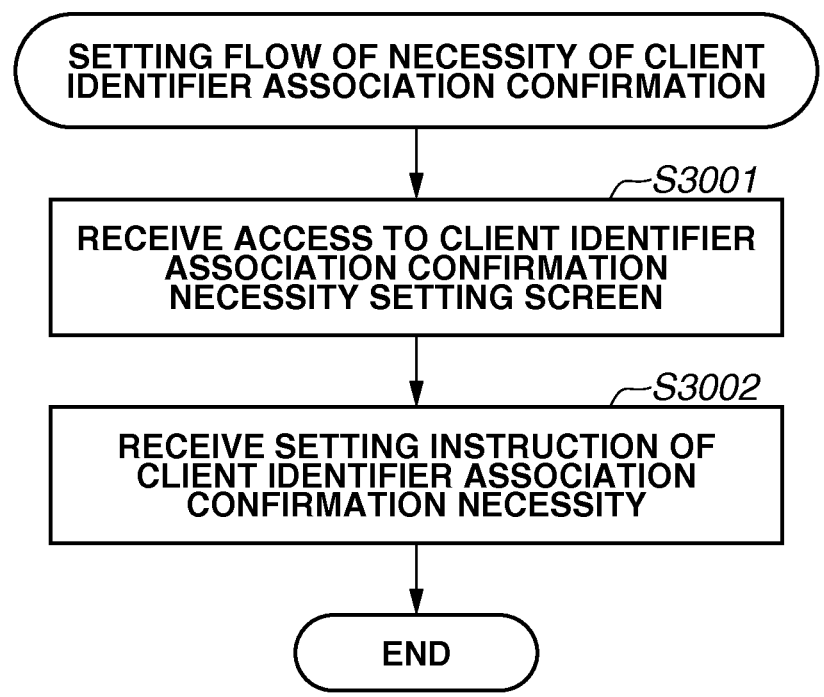
FIG. 12 is a flowchart illustrating setting processing of necessity of association confirmation according to the third exemplary embodiment.

FIG. 12 is a flowchart illustrating a setting flow of necessity of the client identifier association confirmation implemented by the authentication/authorization server 151 according to the present exemplary embodiment. This processing flow is started when the authentication/authorization server 151 receives the access request to a client identifier association confirmation necessity setting screen 3401.

Figure 14:
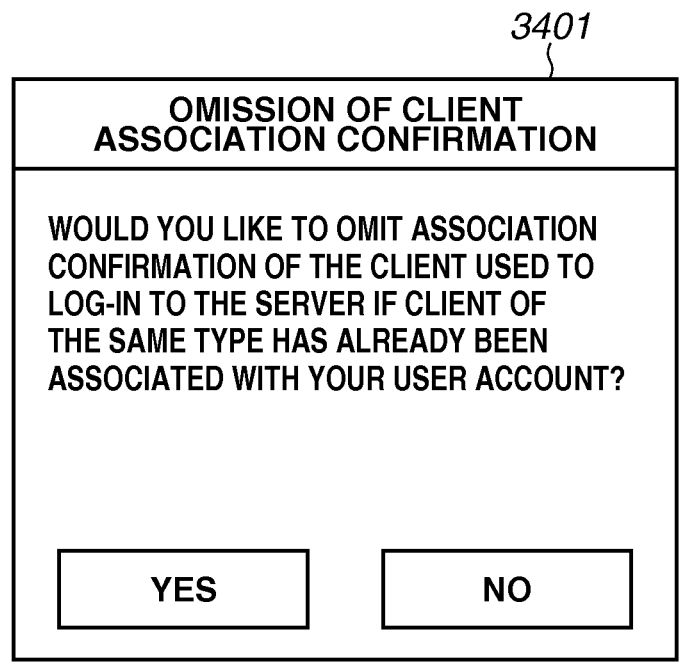
FIG. 14 is a diagram illustrating a display example of a screen according to the third exemplary embodiment.

In step S3001, the association confirmation necessity management module 322 receives the access request to the client identifier association confirmation necessity setting screen 3401. The client identifier association confirmation necessity setting screen 3401 as illustrated in FIG. 14 is displayed on the screen.

In step S3002, the association confirmation necessity management module 322 receives a setting instruction of necessity of the client identifier association confirmation, stores the setting thereof in an association confirmation necessity table, and ends the processing flow. Table 7 is the association confirmation necessity table in which the setting of necessity of the client identifier association confirmation is stored for each user information. For example, in Table 7, the association confirmation is set to be omitted for the user information "User X".

TABLE 7

| User | Association Confirmation Necessity Setting |
| --- | --- |
| User X | Always omit confirmation. |
| : | : |

Figure 13:
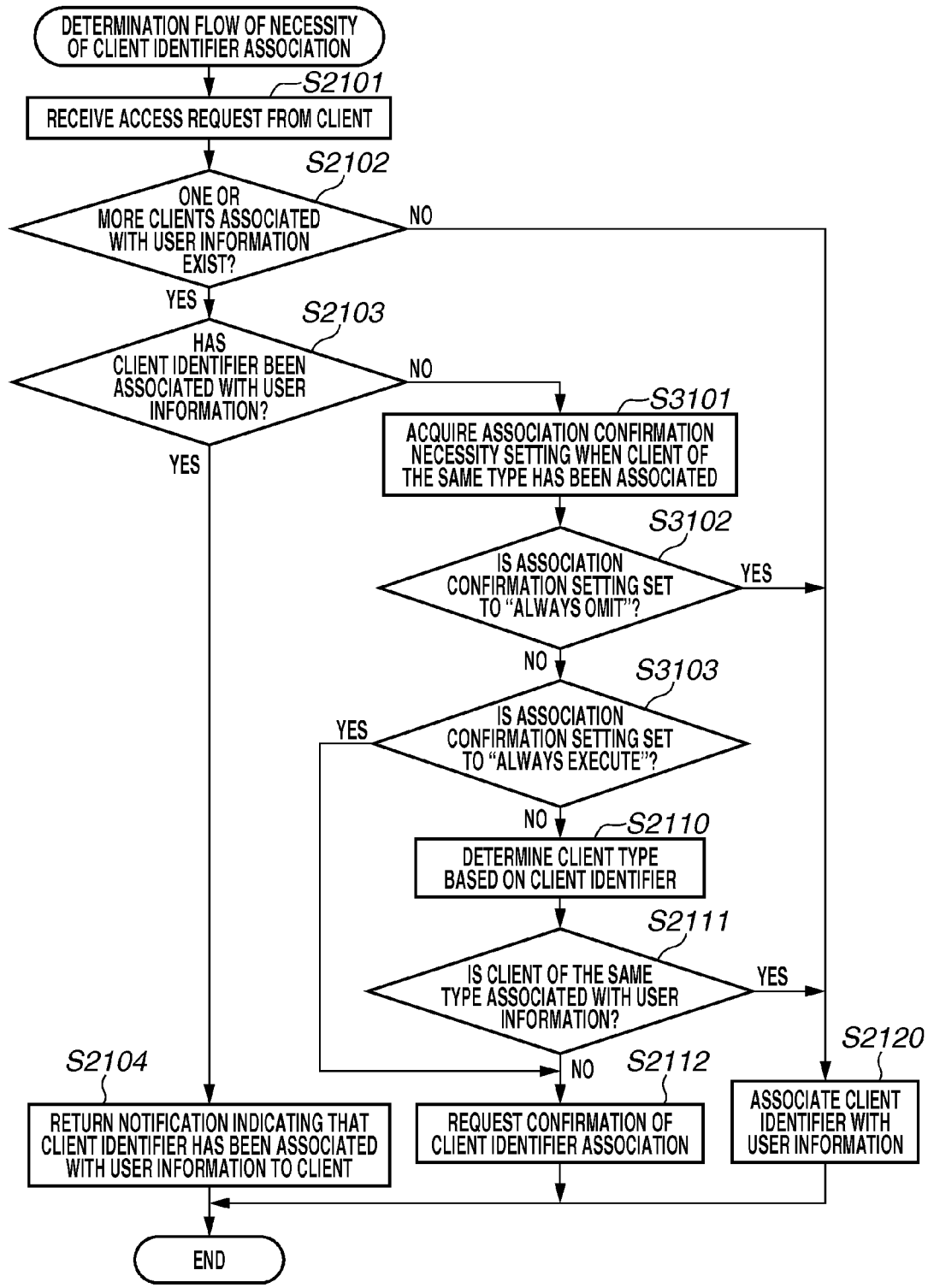
FIG. 13 is a flowchart illustrating determination processing of necessity of association confirmation according to the third exemplary embodiment.

FIG. 13 is a flowchart illustrating a determination flow of necessity of the client identifier association implemented by the authentication/authorization server 151 according to the present exemplary embodiment. This processing flow is started when the authentication/authorization server 151 receives the access request from the client module 351.

In step S3101, the association confirmation necessity management module 322 acquires the association confirmation necessity setting of the user information from the association confirmation necessity table of Table 7. In step S3102, the third client identifier association management module 321 determines whether the association confirmation necessity setting of the user information acquired in step S3101 is set to "always omit the confirmation". If the association confirmation necessity setting is set to "always omit the confirmation" (YES in step S3102), the processing proceeds to step S2120. If the association confirmation necessity setting is not set to "always omit the confirmation" (NO in step S3102), the processing proceeds to step S3103.

In step S3103, the third client identifier association management module 321 determines whether the association confirmation necessity setting of the user information acquired in step S3101 is set to "always execute the confirmation". If the association confirmation necessity setting is set to "always execute the confirmation" (YES in step S3103), the processing proceeds to step S2112. If the association confirmation necessity setting is not set to "always execute the confirmation" (NO in step S3103), the processing proceeds to step S2110. FIG. 14 is a diagram illustrating a display example of the client identifier association confirmation necessity setting screen 3401 according to the present exemplary embodiment. According to the present exemplary embodiment, by previously making settings on the authentication/authorization server 151, the user can omit the association confirmation operation regardless of a client type, and thus the convenience for the user can be further improved.

Next, a fourth exemplary embodiment of the present invention will be described with reference to the drawings. Further, only the configuration different from those of the first, the second, and the third exemplary embodiments will be described while description of the configuration common to all of the exemplary embodiments will be omitted. Described below is a method enabling the user to specify whether to associate the client identifier with the user information when the user operates the log-in screen, according to the present exemplary embodiment.

Figure 15A:
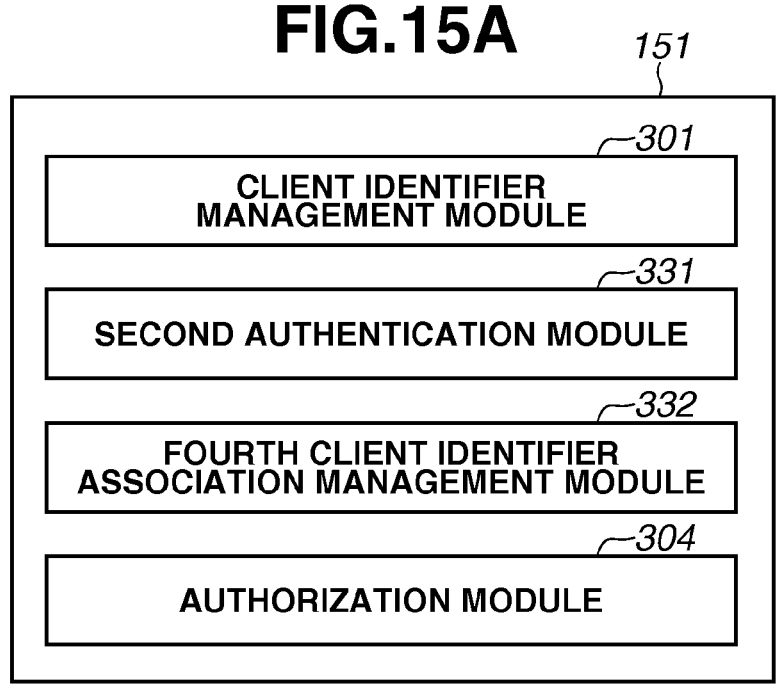
FIGS. 15A, 15B, and 15C are diagrams each illustrating a module configuration according to a fourth exemplary embodiment.
Figure 15B:
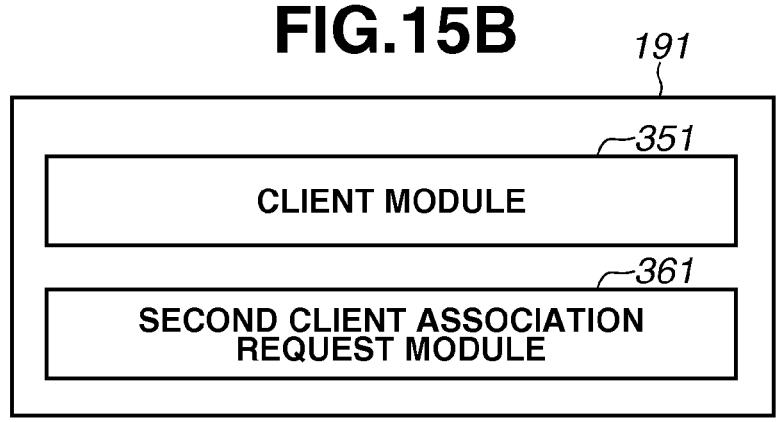
Figure 15C:
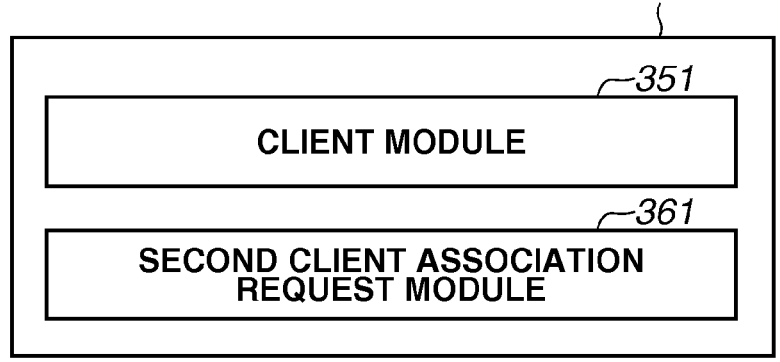

FIGS. 15A, 15B, and 15C are diagrams illustrating module configurations of the authentication/authorization server 151, the mobile terminals 191, and 192, respectively, according to the present exemplary embodiment. The authentication/authorization server 151 includes the client identifier management module 301, a second authentication module 331, a fourth client identifier association management module 332, and the authorization module 304. Each of the mobile terminals 191 and 192 includes the client module 351 and a second client association request module 361.

Figure 16A:
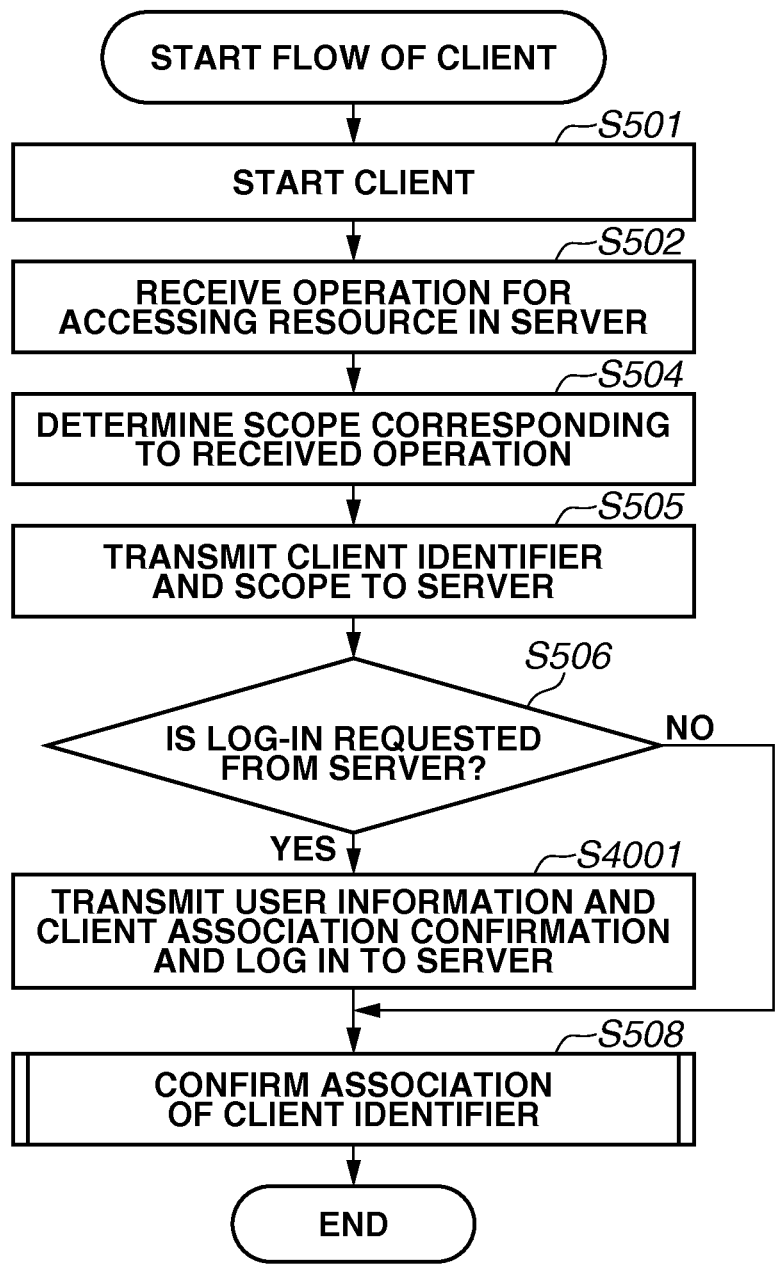
FIGS. 16A and 16B are flowcharts illustrating start processing and log-in processing of the client, respectively, according to the fourth exemplary embodiment.

FIG. 16A is a flowchart illustrating a start flow of the client implemented by the mobile terminal 191 or 192 according to the present exemplary embodiment. This processing flow is started when the user operates the client module 351. In step S4001, in response to a request from the authentication/authorization server 151, the second client association request module 361 displays a second log-in screen 4401 as illustrated in FIG. 17 and prompts the user to input authentication information. Further, the second client association request module 361 transmits the authentication information input by the user and the client association confirmation specified by the user to the authentication/authorization server 151, and logs in to the authentication/authorization server 151.

Figure 16B:
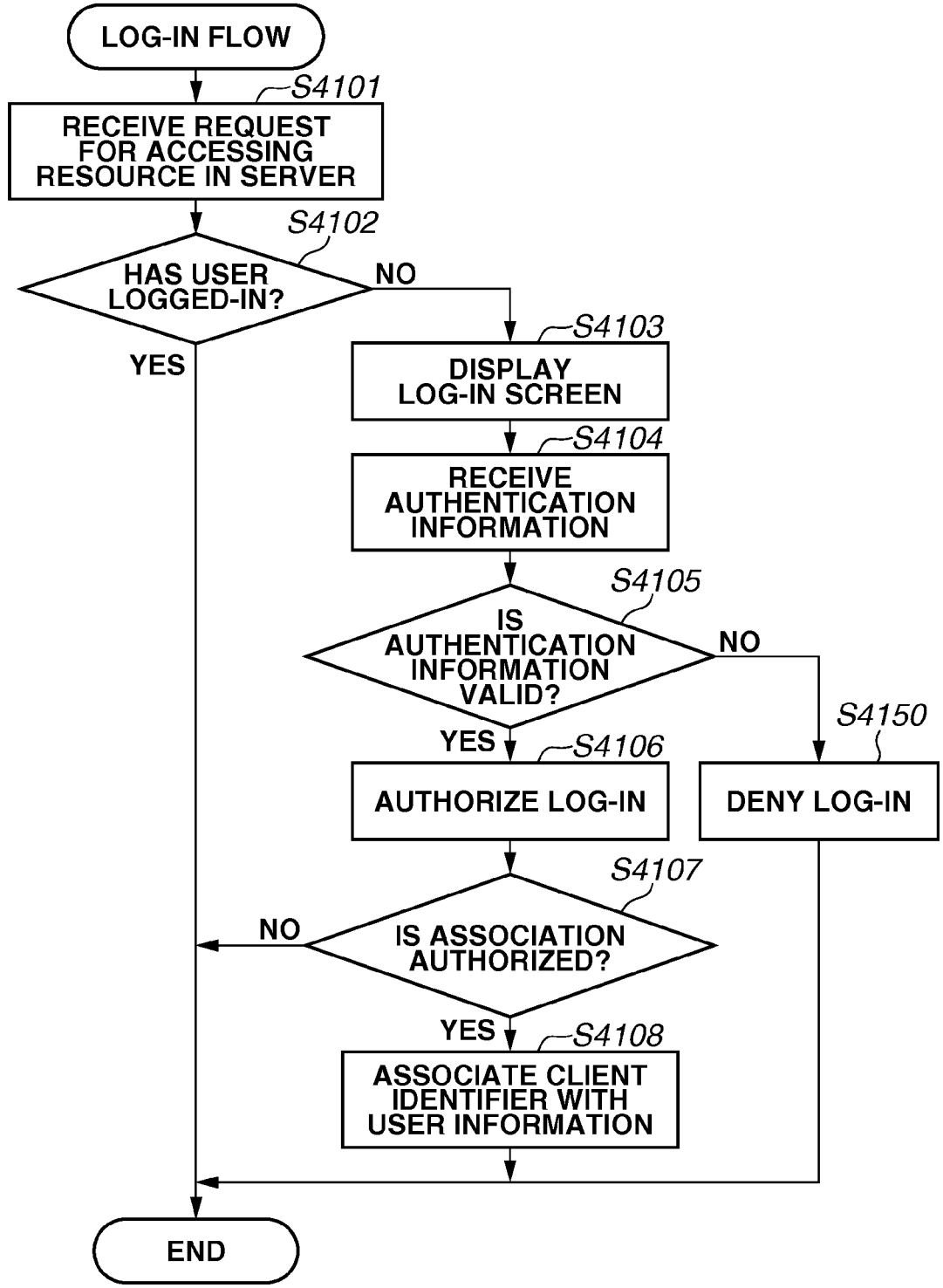

FIG. 16B is a flowchart illustrating a log-in flow implemented by the authentication/authorization server 151 according to the present exemplary embodiment. This processing flow is started when the authentication/authorization server 151 receives a request for accessing the resources from the client module 351. In step S4101, the second authentication module 331 receives the request for accessing the resources in the resource server 152 from the client module 351. In step S4102, the second authentication module 331 determines whether the user relating to the processing in step S4101 has logged-in. If it is determined that the user has logged-in (YES in step S4102), the second authentication module 331 ends the processing. If it is determined that the user has not logged-in (NO in step S4102), the processing proceeds to step S4103.

In step S4103, the second authentication module 331 instructs the client module 351 to display the second log-in screen 4401 as illustrated in FIG. 17. The second log-in screen 4401 allows the user to specify whether to associate the client identifier with the user information when the log-in operation is authorized. In terms of reducing the operation by the user, the association of the client identifier with the user information may desirably be specified in the initial state of the second log-in screen 4401. However, the association of the client identifier does not have to be specified in the initial state thereof.

In step S4104, the second authentication module 331 receives the authentication information, the client identifier, and an instruction indicating whether to associate the client identifier with the user information, which have been input to the second log-in screen 4401. In step S4105, the second authentication module 331 determines whether the authentication information received in step S4104 is valid. If it is determined that the authentication information is valid (YES in step S4105), the processing proceeds to step S4106. If it is determined that the authentication information is invalid (NO in step S4105), the processing proceeds to step S4150.

In step S4106, the second authentication module 331 authorizes the log-in operation by the user. In step S4107, the fourth client identifier association management module 332 determines whether an instruction for associating the client identifier with the user information is received in step S4104. If it is determined that the instruction for associating the client identifier with the user information is received (YES in step S4107), the processing proceeds to step S4108. If it is determined that the instruction for associating the client identifier with the user information is not received (NO in step S4107), the fourth client identifier association management module 332 ends the processing. In step S4108, the fourth client identifier association management module 332 associates the client identifier received in step S4104 with the user information and ends the processing. In step S4150, the second authentication module 331 denies the log-in operation by the user and ends the processing. FIG. 17 is a diagram illustrating an example of the second log-in screen 4401 according to the present exemplary embodiment.

According to the present exemplary embodiment, because the user can specify whether to associate the client identifier at the time of the log-in operation, the user does not have to execute the confirmation operation of the client identifier association separately, and thus the convenience for the user can be further improved.

Specifically, in a case where the association of the client identifier with the user information is specified in the initial state of the second log-in screen 4401, the user can realize the association of the client identifier without performing an extra operation such as checking a checkbox to specify whether to associate the client identifier with the user information, while omitting the operation executed on the client association confirmation screen 1402 illustrated in FIG. 8B. Therefore, the convenience for the user is improved. Furthermore, in a case where the user does not want to associate the client identifier, the user may uncheck the checkbox on the second log-in screen 4401 to continue the log-in operation without associating the client identifier with the user information.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-112626, filed May 30, 2014, which is hereby incorporated by reference herein in its entirety.

What is claimed is:

1. An authentication server system capable of communicating with a server system providing a service accessible from a first client and a second client, the authentication server system comprising:
one or more processors; and
at least one memory device storing a program which, when executed by the one or more processors, causes the authentication server system to function as:
an authentication unit configured to determine whether a user is a legitimate user based on authentication information input by the user via an authentication screen displayed on the first client;
an issuance unit configured to issue authority information indicating that authority of the user has been delegated to the first client in a case where the user, determined to be the legitimate user by the authentication unit, provides an instruction for authorizing, under the authority of the user on the service, the first client via an authorization confirmation screen displayed on the first client;
an authorization unit configured to authorize the first client to access the service by the authority of the user based on the authority information transmitted when the first client requests an access to the service;
a management unit configured to manage an identifier of the user determined to be the legitimate user by the authentication unit and an identifier of a client in association with each other;
wherein the legitimate user is a user who has accessed the authentication server system using the second client and has been authenticated based on authentication information input by the user via an authentication screen displayed on the second client, and, after authentication, the
legitimate user issues an instruction to associate the legitimate user with the identifier of the second client via a client association confirmation screen,
a first determination unit configured to determine whether the authority information has been issued for any of client identifiers associated with the identifier of the user determined to be the legitimate user by the authentication unit; and
a second determination unit configured to determine whether the identifier of the user determined to be the legitimate user by the authentication unit is associated with the identifier of the second client used by the user wherein, in a case where the first determination unit determines that the authority information has been issued for the any of client identifiers and the management second determination unit determines that the identifier of the user determined to be the legitimate user by the authentication unit is associated with the identifier of the second client, the issuance unit issues authority information indicating that the authority of the user has been delegated to the second client without receiving an instruction for authorizing the second client on the service,
wherein in a case where the management unit confirms that the second client operated by the user is not associated with the identifier of the user after the user has been determined to be the legitimate user by the authentication unit, the management unit provides an association confirmation screen for inquiring whether to associate the identifier of the user with the identifier of the second client in order to omit an operation for providing the instruction for authorizing the authority of the user on the service to be delegated to the second client, and manages the identifier of the user and the identifier of the second client in association with each other in response to an instruction for associating the identifier of the user with the identifier of the second client instructed via the association confirmation screen, and
wherein the management unit manages the identifier of the user, the identifier of the first client, and a type of the first client in association with one another, and in a case where a type of the second client is same as the type of the first client when the identifier of the user is to be associated with the identifier of the second client, the management unit manages the identifier of the user and the identifier of the second client in association with each other without receiving the instruction for associating the identifier of the user with the identifier of the second client via the association confirmation screen.

2. The authentication server system according to claim 1, wherein, in a case where it is previously set to omit the association confirmation screen when an instruction for associating the identifier of the user with an identifier of an optional client is issued by the user, the management unit manages the identifier of the user and the identifier of the first client in association with each other without receiving an instruction for associating the identifier of the user with the identifier of the first client via the association confirmation screen when the identifier of the user is to be associated with the identifier of the first client.

3. The authentication server system according to claim 1, wherein, in a case where the authority information is not issued by the issuance unit, the authorization unit does not authorize the first client and/or the second client to access the service by the authority of the user.

4. The authentication server system according to claim 1, wherein, in a case where the identifier of the user is associated with an identifier of an optional client, the issuance unit performs control to not display the authorization confirmation screen on the optional client.

5. A method executed by an authority delegation system including a server system providing a service accessible from a first client and a second client, and an authentication server system, the method comprising:
determining, by an authentication unit, whether a user is a legitimate user based on authentication information input by the user via an authentication screen displayed on the first client;
issuing, by an issuance unit, authority information indicating that authority of the user has been delegated to the first client in a case where the user, determined to be the legitimate user by the authentication unit, provides an instruction for authorizing, under the authority of the user on the service, the first client via an authorization confirmation screen displayed on the first client;
authorizing, by an authorization unit, the first client to access the service by the authority of the user based on the authority information transmitted when the first client requests an access to the service;

managing, by a management unit, an identifier of the user, determined to be the legitimate user by the authentication unit, and an identifier of a client in association with each other;

wherein the legitimate user is a user who has accessed the authentication server system using the second client and has been authenticated based on authentication information input by the user via an authentication screen displayed on the second client, and, after authentication, the legitimate user issues an instruction to associate the legitimate user with the identifier of the second client via a client association confirmation screen, determining, by a first determination unit, whether the authority information has been issued for any of client identifiers associated with the identifier of the user determined to be the legitimate user by the authentication unit; and determining, by a second determining unit, whether the identifier of the user determined to be the legitimate user by the authentication unit is associated with the identifier of the second client used by the user wherein, the issuance unit further issues authority information indicating that the authority of the user has been delegated to the second client without receiving an instruction for authorizing the second client on the service, in a case where the first determination unit determines that the authority information has been issued for the any of client identifiers and the second determination unit determines that the identifier of the user determined to be the legitimate user by the authentication unit is associated with the identifier of the second client, wherein in a case where the management unit confirms that the second client operated by the user is not associated with the identifier of the user after the user has been determined to be the legitimate user by the authentication unit, the management unit provides an association confirmation screen for inquiring whether to associate the identifier of the user with the identifier of the second client in order to omit an operation for providing the instruction for authorizing the authority of the user on the service to be delegated to the second client, and manages the identifier of the user and the identifier of the second client in association with each other in response to an instruction for associating the identifier of the user with the identifier of the second client instructed via the association confirmation screen, and wherein the management unit manages the identifier of the user, the identifier of the first client, and a type of the first client in association with one another, and in a case where a type of the second client is same as the type of the first client when the identifier of the user is to be associated with the identifier of the second client, the management unit manages the identifier of the user and the identifier of the second client in association with each other without receiving the instruction for associating the identifier of the user with the identifier of the second client via the association confirmation screen.

6. The method according to claim 5, wherein, in a case where it is previously set to omit the association confirmation screen when an instruction for associating the identifier of the user with an identifier of an optional client is issued by the user, the management unit manages the identifier of the user and the identifier of the first client in association with each other without receiving an instruction for associating the identifier of the user with the identifier of the first client via the association confirmation screen when the identifier of the user is to be associated with the identifier of the first client.

7. The method according to claim 5, wherein, in a case where the authority information is not issued by the issuance unit, the authorization unit does not authorize the first client and/or the second client to access the service by the authority of the user.

8. The method according to claim 5, wherein, in a case where the identifier of the user is associated with an identifier of an optional client, the issuance unit performs control to not display the authorization confirmation screen on the optional client.

9. An authority delegation system including a server system providing a service accessible from a first client and a second client, and an authentication server system according to claim 1.

10. A non-transitory computer-readable storage medium storing a program for causing a computer to execute a method in an authentication server system capable of communicating with a server system providing a service accessible from a first client and a second client, the method comprising:

determining, by a authentication unit, whether a user is a legitimate user based on authentication information input by the user via an authentication screen displayed on the first client;

issuing, by an issuance unit, authority information indicating that authority of the user has been delegated to the first client in a case where the user, determined to be the legitimate user, provides an instruction for authorizing, under the authority of the user on the service, the first client via an authorization confirmation screen displayed on the first client;

authorizing, by an authorization unit, the first client to access the service by the authority of the user based on the authority information transmitted when the first client requests an access to the service;

managing, by a management unit, an identifier of the user determined to be the legitimate user and an identifier of a client in association with each other;

wherein the legitimate user is a user who has accessed the authentication server system using the second client and has been authenticated based on authentication information input by the user via an authentication screen displayed on the second client, and, after authentication, the legitimate user issues an instruction to associate the legitimate user with the identifier of the second client via a client association confirmation screen, determining, by a first determination unit, whether the authority information has been issued for any of client identifiers associated with the identifier of the user determined to be the legitimate user by a authentication unit; and wherein authority information indicating that the authority of the user has been delegated to the second client is issued without receiving an instruction for authorizing the second client on the service, in a case where the first determination unit determines that the authority information has been issued for the any of client identifiers and a second determination unit determines that the identifier of the user determined to be the legitimate user by the authentication unit is associated with the identifier of the second client, wherein in a case where the management unit confirms that the second client operated by the user is not associated with the identifier of the user after the user has been determined to be the legitimate user by the authentication unit, the management unit provides an association confirmation screen for inquiring whether to associate the identifier of the user with the identifier of the second client in order to omit an operation for providing the instruction for authorizing the authority of the user on the service to be delegated to the second client, and manages the identifier of the user and the identifier of the second client in association with each other in response to an instruction for associating the identifier of the user with the identifier of the second client instructed via the association confirmation screen, and wherein the management unit manages the identifier of the user, the identifier of the first client, and a type of the first client in association with one another, and in a case where a type of the second client is same as the type of the first client when the identifier of the user is to be associated with the identifier of the second client, the management unit manages the identifier of the user and the identifier of the second client in association with each other without receiving the instruction for associating the identifier of the user with the identifier of the second client via the association confirmation screen.

11. A system including a first client, a second client and an authentication server system capable of communicating with a server system providing a service accessible from the first client and the second client, the system comprising:

one or more processors; and at least one memory device storing a program which, when executed by the one or more processors, causes the authentication server system to act as:

an authentication unit configured to determine whether a user is a legitimate user based on authentication information input by the user via an authentication screen displayed on the first client;

an issuance unit configured to issue authority information indicating that authority of the user has been delegated to the first client in a case where the user, determined to be the legitimate user by the authentication unit, provides an instruction for authorizing, under the authority of the user on the service, the first client via an authorization confirmation screen displayed on the first client;

an authorization unit configured to authorize the first client to access the service by the authority of the user based on the authority information transmitted when the first client requests an access to the service;

a management unit configured to manage an identifier of the user determined to be the legitimate user by the authentication unit and an identifier of a client in association with each other;

wherein the legitimate user is a user who has accessed the authentication server system using the second client and has been authenticated based on authentication information input by the user via an authentication screen displayed on the second client, and, after authentication, the legitimate user issues an instruction to associate the legitimate user with the identifier of the second client via a client association confirmation screen, a first determination unit configured to determine whether the authority information has been issued for any of client identifiers associated with the identifier of the user determined to be the legitimate user by the authentication unit; and a second determination unit configured to determine whether the identifier of the user determined to be the legitimate user by the authentication unit is associated with the identifier of the second client used by the user wherein, in a case where the first determination unit determines that the authority information has been issued for the any of client identifiers and the management second determination unit determines that the identifier of the user determined to be the legitimate user by the authentication unit is associated with the identifier of the second client, the issuance unit issues authority information indicating that the authority of the user has been delegated to the second client without receiving an instruction for authorizing the second client on the service, wherein in a case where the management unit confirms that the second client operated by the user is not associated with the identifier of the user after the user has been determined to be the legitimate user by the authentication unit, the management unit provides an association confirmation screen for inquiring whether to associate the identifier of the user with the identifier of the second client in order to omit an operation for providing the instruction for authorizing the authority of the user on the service to be delegated to the second client, and manages the identifier of the user and the identifier of the second client in association with each other in response to an instruction for associating the identifier of the user with the identifier of the second client instructed via the association confirmation screen, and wherein the management unit manages the identifier of the user, the identifier of the first client, and a type of the first client in association with one another, and in a case where a type of the second client is same as the type of the first client when the identifier of the user is to be associated with the identifier of the second client, the management unit manages the identifier of the user and the identifier of the second client in association with each other without receiving the instruction for associating the identifier of the user with the identifier of the second client via the association confirmation screen.

* * * * *